US010358597B2

(12) United States Patent
Casey et al.

(10) Patent No.: US 10,358,597 B2
(45) Date of Patent: Jul. 23, 2019

(54) METHOD OF IMPROVING PHOTOLUMINESCENCE OF SILICON NANOPARTICLES

(71) Applicant: DOW CORNING CORPORATION, Midland, MI (US)

(72) Inventors: James A. Casey, Merrill, MI (US); Ludmil M. Zambov, Midland, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 592 days.

(21) Appl. No.: 14/417,913

(22) PCT Filed: Jul. 30, 2013

(86) PCT No.: PCT/US2013/052717
§ 371 (c)(1),
(2) Date: Jan. 28, 2015

(87) PCT Pub. No.: WO2014/022388
PCT Pub. Date: Feb. 6, 2014

(65) Prior Publication Data
US 2015/0218443 A1    Aug. 6, 2015

Related U.S. Application Data

(60) Provisional application No. 61/677,134, filed on Jul. 30, 2012.

(51) Int. Cl.
*C09K 11/59* (2006.01)
*C01B 33/02* (2006.01)

(52) U.S. Cl.
CPC .............. *C09K 11/59* (2013.01); *C01B 33/02* (2013.01)

(58) Field of Classification Search
CPC ....................................................... C09K 11/59
See application file for complete search history.

(56) References Cited

U.S. PATENT DOCUMENTS

2011/0204290 A1    8/2011    Koshida et al.

FOREIGN PATENT DOCUMENTS

JP      2007-026728 A      2/2007
WO     WO2007117265 A2    10/2007
(Continued)

OTHER PUBLICATIONS

Seraphin. Surface control of luminescence in silicon nanoparticles. J. Appl. Phys. 80 (11), Dec. 1, 1996.*
(Continued)

*Primary Examiner* — Matthew E. Hoban
(74) *Attorney, Agent, or Firm* — Warner Norcross & Judd LLP

(57) ABSTRACT

A method of improving the photoluminescence of silicon nanoparticles is provided along with a description of the silicon nanoparticle compositions prepared therefrom. The method generally comprises exposing a composition comprising silicon nanoparticles having a mean particle diameter not greater than 5 nm and a fluid to a non-ambient condition selected from (i) elevated temperature, (ii) elevated humidity, (iii) elevated pressure exerted by an oxygen-containing gas, (iv) a hydrogen plasma, (v) hydrogen gas, (vi) ultraviolet radiation, and (vii) and a combination of at least two of (i)-(vi). Optionally, the silicon nanoparticles may be prepared by a gas phase reaction. The exposure of the silicon nanoparticle compositions to the non-ambient condition results in improved photoluminescence. In particular, the exposed nanoparticles exhibit increased maximum emission intensity and luminescent quantum efficiency. Moreover, (Continued)

these improvements are accompanied by a blue shift in the emitted light to a shorter wavelength.

16 Claims, 22 Drawing Sheets

(56) References Cited

FOREIGN PATENT DOCUMENTS

| WO | WO2009047995 A1 | 4/2009 |
|---|---|---|
| WO | WO2010027959 A1 | 3/2010 |
| WO | WO2011/109299 * | 9/2011 |
| WO | WO2011109299 A1 | 9/2011 |

OTHER PUBLICATIONS

PCT/US2013/052717 International Search Report dated Sep. 9, 2013, 4 pages.
English language abstract for WO2009047995A1 extracted from espacenet.com database on Jan. 19, 2015, 1 page.
English language abstract and machine assisted English translation for JP2007-0267286 extracted from http://www4.ipdl.inpit.go.jp/ database on Jan. 19, 2015, 16 pages.

* cited by examiner

METHOD OF IMPROVING PHOTOLUMINESCENCE OF SILICON NANOPARTICLES

CROSS-REFERENCE TO RELATED APPLICATIONS

This application is the National Stage of International Patent Application No. PCT/US2013/052717, filed on Jul. 30, 2013, which claims the priority to and all advantages of U.S. Patent Application No. 61/677,134, filed on Jul. 30, 2012, the content of which is hereby incorporated by reference.

FIELD

This disclosure relates generally to silicon nanoparticles. More specifically, this disclosure relates to a method of enhancing the photoluminescence of silicon nanoparticles and the silicon nanoparticle compositions resulting therefrom.

BACKGROUND

The statements in this section merely provide background information related to the present disclosure and may not constitute prior art.

One key characteristic of small (<5 nm) silicon nanoparticles is that these particles are photoluminescent in visible light when stimulated by a source of lower wavelength light. This is thought to be caused by a quantum confinement effect that occurs when the diameter of the nanoparticle is smaller than the exciton radius, which results in bandgap bending (i.e., increasing of the gap). Although silicon is an indirect bandgap semiconductor in bulk, silicon nanoparticles having a diameter below five nanometers emulate a direct bandgap material. Since direct bandgap materials can be used in optoelectronic applications, silicon nanoparticles have the potential to become a key material for use in future optoelectronic applications. However, the preparation of nanoparticles with surface properties that allow for prolonged stabilization, i.e., minimize agglomeration, and that also exhibit maximum emission intensity and luminescent quantum efficiency has been and still is a persistent challenge.

Academic and industrial laboratories have conducted and continue to conduct research directed towards the development of manufacturing methods and reactors that can be used to produce nanoparticles and modify the properties exhibited by the nanoparticles formed therefrom. Several of these methods include the use of microreactor plasma, aerosol thermal decomposition of silane, ultrasonication of etched silicon, laser ablation of silicon, and plasma discharges. Plasma discharges provide an opportunity to produce nanoparticles either at high temperatures using atmospheric plasma or at approximately room temperature using low pressure plasma. Luminescent silicon nanoparticles have been produced using ultrahigh vacuum and very high frequency (e.g., radiofrequency) capacitively coupled plasmas. The very high frequency allows for the coupling between the radio frequency (rf) power and the discharge to produce a high ion density and ion energy plasma. However, such a capacitively coupled system requires a relatively high input power (~200 W) in order to provide plasma that exhibits even modest power (~5 W) because a large amount of the input radiofrequency power is reflected back to the power supply.

SUMMARY

In overcoming the enumerated drawbacks and other limitations of the related art, the present disclosure provides a method of enhancing the photoluminescence of silicon nanoparticles. The present invention relates to a method of improving the photoluminescence of silicon nanoparticles and to the compositions of silicon nanoparticles prepared therefrom. The method comprises exposing a composition comprising silicon nanoparticles having a mean particle diameter not greater than 5 nm and a fluid to a non-ambient condition selected from (i) elevated temperature, (ii) elevated humidity, (iii) elevated pressure exerted by an oxygen-containing gas, (iv) a hydrogen plasma, (v) hydrogen gas, (vi) ultraviolet radiation, and (vii) and a combination of at least two of (i)-(vi). Optionally, the silicon nanoparticles may be prepared by a gas phase reaction. For example, a composition comprising silicon nanoparticles and a fluid may be prepared by forming the silicon nanoparticles in a low pressure high frequency pulsed plasma reactor and collecting the nanoparticles in a capture fluid with in the reactor.

The exposure of the silicon nanoparticle compositions to molecular hydrogen, hydrogen plasma, ultraviolet radiation, elevated temperature, elevated humidity, and/or elevated pressure results in improved photoluminescence. In particular, the exposed or treated nanoparticles exhibit increased maximum emission intensity and luminescent quantum efficiency. Moreover, these improvements are accompanied by a blue shift in the emitted light to a shorter wavelength. Prior to exposing the composition to a non-ambient condition, the composition may, when desired, be exposed to ambient temperature, pressure, relative humidity, and air.

According to one aspect of the present disclosure, the composition is exposed to the non-ambient condition for an amount of time sufficient to increase the maximum emission intensity of the composition when excited by light having a wavelength of from 190 to 600 nm.

One example in which the non-ambient condition is a combination of two different conditions includes exposure of the silicon nanoparticle composition to both elevated temperature and elevated humidity. In this case, the elevated temperature ranges from above ambient temperature up to the boiling point of the fluid; and the elevated humidity ranges from 30 to 100% relative humidity (RH).

Another example in which the non-ambient condition represents a combination of conditions includes exposing the silicon nanoparticle composition to a hydrogen plasma and then to a combination of elevated temperature and elevated humidity.

Yet another example in which the silicon nanoparticle composition is exposed to a combination of non-ambient conditions includes exposing the composition to a combination of elevated temperature and elevated pressure exerted by an oxygen-containing gas, such as oxygen or air. In this case, the elevated temperature ranges from above ambient temperature up to the boiling point of the fluid and the elevated pressure is greater than atmospheric pressure. Alternatively, the elevated pressure is between atmospheric pressure and 4,000 psig ($2.768 \times 10^7$ Pa).

According to another aspect of the present disclosure, the silicon nanoparticle compositions prepared according to the method(s) described herein comprise a plurality of silicon nanoparticles having a diameter that is not greater than 5 nm dispersed in a fluid. The concentration of the silicon nanoparticles in the fluid that make up the silicon nanoparticle composition is greater than 0.0001% (w/w) and less than 50% (w/w). The concentration of the nanoparticles in the composition is selected such that the agglomeration of nanoparticles in the selected fluid is minimized.

The fluid may be comprised of a solvent, a silicone fluid, or a mixture thereof. When the fluid is a silicone fluid, it is selected as one from the group of a polydimethylsiloxane, phenylmethyl dimethyl cyclosiloxane, tetramethyltetraphenyl-trisiloxane, pentaphenyltrimethyltri-siloxane, and mixtures or compositions thereof.

The silicon nanoparticles may comprise silicon, a silicon alloy, or a mixture thereof. A silicon alloy is generally comprised of silicon and an element selected from at least one of germanium, boron, phosphorous, and nitrogen.

According to yet another aspect of the present disclosure, the exposed composition has maximum emission intensity at a wavelength that is greater than the excitation wavelength. Alternatively, the exposed composition has a maximum intensity at a wavelength that is between 1.1 and 1.5 times greater than an excitation wavelength of from 190 to 600 nm. The silicon nanoparticle compositions of the present disclosure exhibit a maximum emission wavelength that is longer prior to exposure than after exposure to the non-ambient condition. More specifically, the exposed composition has a maximum emission wavelength of from 460 to 1100 nm, alternatively from 500 to 700 nm, at an excitation wavelength of from 250 to 450 nm.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
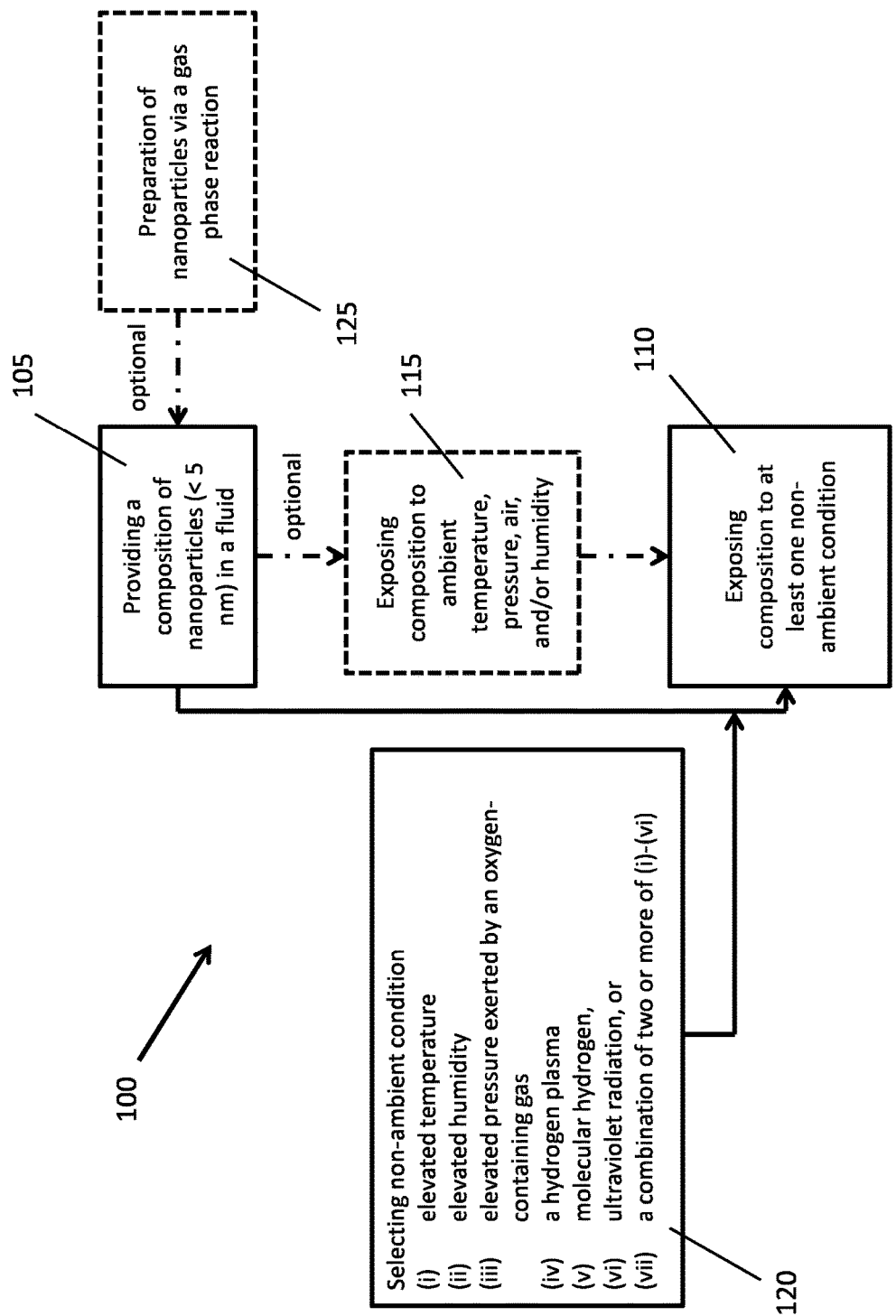
FIG. 1 is a graphical representation of a method of enhancing the photoluminescence of a silicon nanoparticle composition according to the teachings of the present disclosure.

The following description is merely exemplary in nature and is in no way intended to limit the present disclosure or its application or uses. It should be understood that throughout the description, corresponding reference numerals indicate like or corresponding parts and features.

The present disclosure generally relates to a method of improving the photoluminescence of silicon nanoparticles and to silicon nanoparticle compositions prepared therefrom. More specifically, referring to FIG. 1, the method 100 comprises providing 105 a composition in which silicon nanoparticles that have a mean particle diameter that is not greater than about 5 nanometers (nm) are dispersed in a fluid; and then exposing 110 the silicon nanoparticle composition to a non-ambient condition for a time sufficient to enhance the photoluminescence of the composition. The dispersion of silicon nanoparticles in the fluid refers to the nanoparticles being mixed with the fluid to such that the nanoparticles become distributed throughout the fluid without the occurrence of any substantial amount of particle agglomeration. The enhancement in the photoluminescence of the composition refers to (a) an increase in maximum emission intensity, (b) an increase in maximum quantum efficiency, (c) a blue shift in the wavelength associated with the maximum emission intensity, (d) a shift in the emitted light to a longer wavelength than the wavelength of the excitation light, or (e) a combination or mixture of two or more of (a)-(d). When desirable, the silicon nanoparticle composition may be optionally subjected 115 to ambient temperature, pressure, relative humidity, and air prior to exposure 110 to the non-ambient condition.

The silicon nanoparticle composition is exposed 110 to the non-ambient condition for an amount of time sufficient to increase the maximum emission intensity of the composition when excited by ultraviolet or visible light. Upon exposure to the non-ambient condition, the nanoparticles in the exposed composition exhibit increased maximum emission intensity. The exposed composition exhibits maximum emission intensity that is at least about 75% greater than the maximum emission intensity of the composition prior to exposure to the non-ambient condition. Alternatively, the maximum emission intensity of the composition increases by at least about 125%; alternatively, by at least about 350%; alternatively, by at least about 550% upon exposure to the non-ambient condition.

A shift in the emitted light to a longer wavelength than the wavelength of the excitation light may also occur. Alternatively, the exposed composition has maximum emission intensity at a wavelength of at least 500 nm when exposed to light having an excitation wavelength of from about 190 to 600 nm. Alternatively, the exposed composition has a maximum emission wavelength of from about 460 to 1100 nm, alternatively from 500 to 700 nm, at an excitation wavelength of from about 250 to 450 nm. The exposed composition may have maximum emission intensity at a wavelength that is between 1.1 and 1.5 times greater than the excitation wavelength. Alternatively, the exposed composition has maximum intensity at a wavelength that is between 1.1 and 1.2 times greater than the excitation wavelength.

The silicon nanoparticle composition is exposed 110 to the non-ambient condition for an amount of time sufficient to increase the luminescent quantum efficiency (LQE) of the composition. The luminescent quantum efficiency (LQE) of the silicon nanoparticle composition represents the ratio of the number of photons emitted by the composition to the number of photons absorbed by the composition. The exposed composition exhibits a LQE that is at least about 5%, alternatively at least about 10%; alternatively at least about 25%; alternatively at least about 30%. The increase in LQE for the silicon nanoparticle composition that occurs upon exposure to the non-ambient condition is on the order of about 100% or more; alternatively greater than about 300%; alternatively greater than about 350%.

The silicon nanoparticle composition is exposed to the non-ambient condition for a length of time that is sufficient to enhance the photoluminescence of the composition. Typically, this length of time may range from a few minutes to multiple days. Alternatively, the exposure time in on the order of greater than about 20 hours and less than about 10 days.

The silicon nanoparticle compositions prepared according to the method(s) described herein generally comprise a plurality of silicon nanoparticles having a diameter not greater than about 5 nanometers dispersed in a fluid. The silicon nanoparticles may consist essentially of silicon or alternatively, comprise a silicon alloy that comprises silicon and at least one element selected from germanium, boron, phosphorous, and nitrogen. Several examples of silicon alloys that may be formed include, but are not limited to, silicon carbide, silicon germanium, silicon boron, silicon phosphorous, and silicon nitride. According to one aspect of the present disclosure, the silicon alloys may be formed by mixing at least one first precursor gas with a second precursor gas or using a precursor gas that contains the different elements. However, one skilled in the art will understand that other methods of forming silicon alloy nanoparticles may be used without exceeding the scope of the present disclosure.

When desirable, the silicon nanoparticles may undergo gas phase doping upon exposure to a plasma environment. In this case, the second precursor gas is dissociated and at least one element becomes incorporated into the silicon nanoparticles as they are nucleated. Alternatively, the silicon nanoparticles may undergo doping in the gas phase downstream of the location at which the nanoparticles are formed, but before the silicon nanoparticles are captured in a liquid. Alternatively, doped silicon nanoparticles may be produced in the capture fluid where the dopant is preloaded into the capture fluid with interaction with the nanoparticles occurring after they are captured. It is also contemplated within the scope of the present disclosure that doped nanoparticles can be formed by making contact with various gases or liquids, including, but not limited to $BCl_3$, $B_2H_6$, $PH_3$, $GeH_4$, or $GeCl_4$.

The diameter of the silicon nanoparticles is less than about five (5) nanometers and may be referred to as quantum dots. Nanoparticles on the order of 4.9 nm or 5.0 nm begin to exhibit a quantum confinement effect, the photoluminescence of which is observable in the visible spectrum. The concentration of the silicon nanoparticles dispersed in the fluid is such that agglomeration of the nanoparticles is minimized. This concentration may range from 0.0001 wt. % to about 50 wt. %; alternatively, from 0.001 wt. % to about 35.0 wt. %; alternatively, from 0.01 wt. % to about 20.0 wt. %, based on the total weight of the composition with the actual concentration limit at which particle agglomeration begins to occur being dependent upon the properties exhibited by the fluid. Alternatively, the upper limit for concentration of the nanoparticles in the fluid may be about 35.0 wt. %, 20.0 wt. %, 10.0 wt. %, 1.0 wt. %, or 0.1 wt. % depending upon the selection of the fluid. The lower limit for concentration of the nanoparticles in the fluid alternatively may be about 0.001 wt. % or 0.01 wt. %.

The fluid may comprise water; a hydrocarbon solvent, such as toluene or hexane, among others; a silicone; or a mixture or combination thereof. The silicone fluid may be selected as one from the group of polydimethylsiloxane, phenylmethyl dimethyl cyclosiloxane, tetramethyltetraphenyltrisiloxane, pentaphenyltrimethyltri-siloxane, and mixtures or compositions thereof.

The non-ambient condition to which the silicon nanoparticle composition is exposed 110 or subjected to may be selected 120 as one from the group of (i) elevated temperature, (ii) elevated humidity, (iii) elevated pressure exerted by an oxygen-containing gas, (iv) a hydrogen plasma, (v) molecular hydrogen, (vi) ultraviolet radiation, and (vii) a combination or mixture of two or more of (i)-(vi). In various embodiments, the non-ambient condition is selected from (i)-(v) or a combination or mixture of two or more of (i)-(v). In non-ambient condition (i), the elevated temperature may range from slightly above ambient or room temperature up to the boiling point of the fluid. Alternatively, ambient or room temperature is 22° C.±3° C. When the fluid is water, the upper limit for the elevated temperature is 100° C., while for other fluids, the elevated temperature may range up to about 200° C.

In non-ambient condition (ii), the elevated humidity level may range from about 10% relative humidity (RH), alternatively from about 30% RH up to 100% RH. Elevated humidity (ii) may be used in combination with elevated temperature (i) to establish the non-ambient condition (vii) to which the silicon nanoparticle composition is exposed. In this case, the elevated temperature may range from above ambient temperature up to the boiling point of the fluid, while the elevated humidity is in the range of about 30% RH to 100% RH.

In non-ambient condition (iii), the elevated pressure exerted by an oxygen-containing gas may be any pressure that is above atmospheric pressure, alternatively, the pressure may range from above atmospheric pressure to about 5,000 psig ($3.458 \times 10^7$ Pa). According to one aspect of the present disclosure, the oxygen-containing gas is selected from oxygen, air, or a similar mixture of oxygen and inert gases. When oxygen gas is utilized the pressure may alternatively range between above atmospheric pressure to about 3,000 psig ($2.079 \times 10^7$ Pa). Elevated pressure (iii) exerted by an oxygen-containing gas may be used in combination with elevated temperature (i) to establish the non-ambient condition (vii) to which the silicon nanoparticle composition is exposed. In this case, the elevated temperature ranges from above ambient temperature to the boiling point of the fluid and the elevated pressure ranges from above atmospheric pressure to about 5,000 psig ($3.458 \times 10^7$ Pa), alternatively, to about 3,000 psig ($2.079 \times 10^7$ Pa).

In non-ambient conditions (iv) and (v) the silicon nanoparticle compositions are subjected to a hydrogen plasma (e.g., atomic hydrogen) and molecular hydrogen, respectively. Alternatively, the composition may be exposed to non-ambient condition (vii) by exposing the composition in order, first to a hydrogen plasma (iv) and then to a combination of elevated temperature (i) and elevated humidity (ii). The presence of atomic or molecular hydrogen is believed to be capable of passivating any optical defects that may be present on the surface of the nanoparticles. In various embodiments, hydrogen plasma comprises a combination of hydrogen and argon.

In non-ambient condition (vi), the silicon nanoparticle compositions are subjected to ultraviolet radiation. A source of ultraviolet radiation may comprise a high-pressure mercury lamp, medium-pressure mercury lamp, Xe—Hg lamp, or a deep UV lamp. The wavelength of the ultraviolet radiation may vary within the ultraviolet spectrum, as readily understood in the art. Similarly, the dosage of the ultraviolet radiation may vary based on the desired qualities of the silicon nanoparticle compositions. Subjecting the silicon nanoparticle compositions to ultraviolet radiation is distinguished from ultraviolet radiation conventionally utilized for photoinitiating a reaction. Said differently, when the silicon nanoparticle compositions are subjected to non-ambient condition (vi), the ultraviolet radiation is generally utilized solely for improving photoluminescent and/or optical properties of the silicon nanoparticle compositions, and not for initiating curing within the silicon nanoparticle compositions.

In various embodiments, non-ambient condition (vi) may be utilized in combination with any of non-ambient conditions (i)-(v). As one particularly suitable method, non-ambient condition (vi) is utilized in combination with non-ambient condition (iv), i.e., ultraviolet radiation is utilized in combination with hydrogen plasma. For example, the silicon nanoparticle compositions may be subjected to ultraviolet radiation before, during, and/or after subjecting the silicon nanoparticle compositions to hydrogen plasma. In various embodiments, subjecting the silicon nanoparticle compositions to ultraviolet radiation in conjunction with hydrogen plasma provides improved optical properties of the silicon nanoparticles along with improved photoluminescent properties. Wavelengths of the ultraviolet radiation may vary based on the presence or absence of other optional gasses and/or elements, including those associated with certain sources of ultraviolet radiation and/or those associated with the hydrogen plasma. For example, when the silicon nanoparticle compositions are subjected to hydrogen plasma comprising hydrogen and argon, subjecting the silicon nanoparticle compositions to ultraviolet radiation may result in the atomic emission of ultraviolet light from the hydrogen and/or argon as well, which increases exposure of the silicon nanoparticle compositions to the ultraviolet radiation.

The method 100 of the present disclosure may incorporate silicon nanoparticles that are made by any method known to one skilled in the art, including, but not limited to the use of a gas phase reaction 125. The method 100 as described throughout the present disclosure uses a silicon nanoparticle composition prepared by forming nanoparticles in a high frequency, low pressure plasma reactor and collecting said particles in the reactor with a capture fluid is done in order to more fully illustrate the concept and is not intended to limit the disclosure. The incorporation and use of nanoparticles in a fluid in conjunction with other types of processes or methods of preparing nanoparticles is contemplated to be within the scope of the disclosure.

In a high frequency, low pressure plasma process, the photoluminescent silicon nanoparticles can be prepared by providing at least one reactant gas mixture to a plasma reactor system. This reactant gas mixture may comprise a first reactive precursor gas and optionally, an inert gas. The first reactive precursor gas may comprise from about 0.1% to about 50% of the total volume of the reactant gas mixture. The first reactive precursor gas may be selected as one from the group of silanes, disilanes, halogen-substituted silanes, halogen-substituted disilanes, $C_1$-$C_4$ alkyl silanes, $C_1$ to $C_4$ alkyldisilanes, and mixtures thereof. Several examples of the first reactive precursor gas include $SiH_4$, $SiCl_4$, $HSiCl_3$, and $H_2SiCl_2$, among others or combinations thereof. Several examples of the optional inert gas include argon, xenon, neon, or a mixture thereof. When present in the reactant gas mixture, the inert gas may comprise from about 1% to about 99% of the total volume of the reactant gas mixture.

The reactant gas mixture may also comprise a second precursor, which itself can comprise from about 0.1 to about 49.9 volume % of the reactant gas mixture; hydrogen gas that is present in an amount ranging from about 1 to 10 volume % of the reactant gas mixture; or a mixture thereof. The second precursor gas may comprise $BCl_3$, $B_2H_6$, $PH_3$, $GeH_4$, $GeCl_4$, or other gases that contain carbon, germanium, boron, phosphorous, or nitrogen. Preferably, the combination of the first reactive precursor gas and the second precursor gas together make up from about 0.1 to about 50% of the total volume of the reactant gas mixture.

In a high frequency, low pressure plasma process, the operating pressure in the reactor and collection chamber typically ranges from about 1 to about 5 millitorr. The mean particle diameter exhibited by the nanoparticles that are formed therein can be controlled through adjustment of various operating parameters, including but not limited to frequency and ion density, mass flow rate of the reactant gas mixture, the use of pulsation, and adjustment of the orifice size associated with the plasma discharge jet. The use of high frequency plasma yields better power coupling and produces a discharge with higher ion energy and density. The pulsation of the plasma enables one skilled in the art to directly set the residence time for particle nucleation and, thereby, control the particle size distribution and agglomeration kinetics in the plasma. The power may be supplied via a variable frequency radio frequency power amplifier that is triggered by an arbitrary function generator to establish the high frequency. The radio frequency power may be capacitively coupled or inductively coupled into the plasma.

In this type of process, the silicon nanoparticle composition can be prepared by collecting the nanoparticles in a capture fluid that is present in the plasma reactor system. The capture fluid may be selected to allow nanoparticles to be absorbed and dispersed into the fluid as they are collected, thus forming a dispersion or suspension of nanoparticles in the capture fluid. The rate of absorption of the nanoparticles into the capture fluid can be adjusted by the degree to which the capture fluid is agitated. Various forms of agitation include rotational stirring, inversion, and ultrasonication, among others.

Further details and description of methods for preparing photoluminescent silicon nanoparticles and compositions of such silicon nanoparticles having unique properties, as well as the design and operation of a low-pressure, very high frequency pulsed plasma reactor system capable of synthesizing such nanoparticles for use in the silicon nanoparticle compositions of the present disclosure are described in International Patent Publication No.'s WO2010/027959 by J. Casey and V. Shamanian and WO2011/109299 by J. Anderson, J. Casey, and V. Shamanian, the entire contents of which are hereby incorporated by reference. In this type of system, the nanoparticle average size and particle size distribution are manipulated by controlling the residence time of the glow discharge (pulsing plasma) relative to the gas molecular residence time through the discharge and the mass flow rates of the nanoparticle precursor gas (or gases).

The following specific examples are given to further illustrate the method of enhancing the photoluminescent properties of the silicon nanoparticle composition according to the teachings of the present disclosure and should not be construed to limit the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

A designed experiment is used to clarify the conditions needed to increase the luminescent quantum efficiency of silicon nanoparticles dispersed in a fluid. All of the following examples have silicon nanoparticles dispersed in polydimethylsiloxane (PDMS, Dow Corning Corporation, Midland, Mich.), 100 centistoke, prepared according to the synthesis conditions shown in Table 1.

TABLE 1

90 standard cubic centimeters per minute (sccm) Argon, 17.5 sccm $SiH_4$ (2% vol. in Argon), and 6 sccm $H_2$ gas delivered via mass flow controllers to the reactor
Reactor base pressure of <2 × $10^{-8}$ Torr
14 grams of 100 cSt PDMS placed into main chamber at operating pressure of 1 × $10^{-4}$ Torr, rotating at 15 rpm
120 W coupled plasma power at 127 MHz in the discharge tube at 3.5 Torr.
Particles synthesized in discharge tube and injected into the siloxane located 5 cm downstream of the orifice
Deposition rate was 0.01 wt. % of silicon nanoparticles per five (5) minutes of run time.
All samples run for total time and then removed from reactor via a load lock and nitrogen atmosphere glove box.

Each of the samples is aged under ambient air by leaving them in the lab for 3, 12, or 21 days. Each sample is then placed into a 35 mL quartz round bottom dish and subjected to plasma-treated post processing using the following process parameters: 750 sccm $H_2$ and 100 sccm $O_2$; a chuck temperature of 80° C.; a pressure of 7.5 Torr; and a plasma power of 120 W at 13.56 MHz. Each sample is subjected to four 5 minute runs with mixing after each five minute cycle for a total of 20 minutes exposure to the plasma.

The samples are then subjected to temperature and humidity post processing by placing each of the 35 mL quartz round bottom dishes in a temperature and humidity chamber for 168 hours. A total of 0.7 g of each sample is removed from each dish after every 24 hours for use in measuring their excitation and emission spectra. The removed samples are placed in a quartz cuvette and an excitation and/or emission spectrum measured via a Fluorolog-2 spectrofluorometer. The excitation spectrum is measured from 250-500 nm @ 1 nm step with an integration time of 0.1 seconds with the emission held at 700 nm with a 570 nm filter placed between the sample and the emission detector. The emission spectrum is measured from 450-850 nm @ 1 nm step with an integration time of 0.1 seconds with excitation at 365 nm and a 400 nm filter placed between the sample and the emission detector. An Ocean Optics 4000USB spectrometer with an integrated sphere is used to obtain the luminescent quantum efficiency. A 395 nm LED is driven at 10.1 mA as the excitation source. Three spectra of each sample are recorded. In all cases, the reference polydimethlysiloxane sample (PDMS—100 cst) that is used as the background for comparison undergoes the same treatment conditions without silicon nanoparticles.

The emission Spectrum is fitted to a Gaussian distribution according to Equation 1 in order to obtain the maximum emission wavelength, standard deviation, full width at half maximum, intensity, and adjusted $R^2$ of the fit.

$$y = y_0 + \frac{A}{2\sigma\sqrt{\pi/2}} e^{-\frac{(x-x_c)^2}{2\sigma^2}} \quad \text{Eq. 1}$$

The particle size or diameter is determined by transformation of the emission spectrum to particle size or diameter and fitted with a Log normal distribution according to Equations 2 and 3. The mean particle diameter, standard deviation, and adjusted $R^2$ of the fit are recorded.

$$D_p = \frac{2.57811}{(hc/\lambda - 1.11)^{1/1.39}} \qquad \text{Eq. 2}$$

$$y = y_0 + \frac{A}{\sqrt{2\pi}\,(0.3\sigma)x} e^{-\frac{(\ln x/x_c)^2}{2(0.3\sigma)^2}} \qquad \text{Eq. 3}$$

Finally, the luminescent Quantum Efficiency (LQE) is then obtained by determining the integrated total photon count for each spectrum, absorption (350-450 nm) and emission (480-850 nm). The total photon count for the three spectra are then averaged and used to calculate the LQE according to Equation 4.

$$LQE = \frac{\left(N^{\gamma}_{Si\text{-}nps} - N^{\gamma}_{200}\right)_{EM}}{\left(N^{\gamma}_{200} - N^{\gamma}_{Si\text{-}nps}\right)_{Abs}} \cdot 100 \qquad \text{Eq. 4}$$

EXAMPLE 1

A total of 0.01 wt. % of silicon nanoparticles dispersed in 14 g of 100 cst PDMS (according to the synthesis conditions indicated above) is aged at different non-ambient conditions for 14 days. The control condition (Run No. 0) represents a vial of a silicon nanoparticle composition in PDMS that is left open to lab air for the 14 days. In comparison, Run No. 1, represents a "moist" atmosphere condition created by a silicon nanoparticle composition being sealed with in a jar having an air and water vapor atmosphere. In Run No. 2, a "dry" air condition is created by bubbling clean, dry compressed air into a silicon nanoparticle composition in a sealed vial with the excess air being removed via a vent. In Run No. 3, a "moist" air condition is established by bubbling clean dry compressed air through a sealed vial containing water. The head space of the water/air vial is then bubbled into a sealed vial containing a silicon nanoparticle composition. In Run No. 4 a "dry" heat condition is created by placing a silicon nanoparticle composition into an oven at 80° C. Finally, in Run No. 5, a "moist" heat condition is established in which a silicon nanoparticle composition is placed into an oven at 80° C. along with water. Each of the samples (Run No.'s 1-5) are then periodically removed from their respective environments and measured with the Fluorolog-2 spectrofluorometer to obtain the maximum emission wavelength, maximum emission intensity, and average particle diameter as functions of the time in the aging environment.

Figure 2:
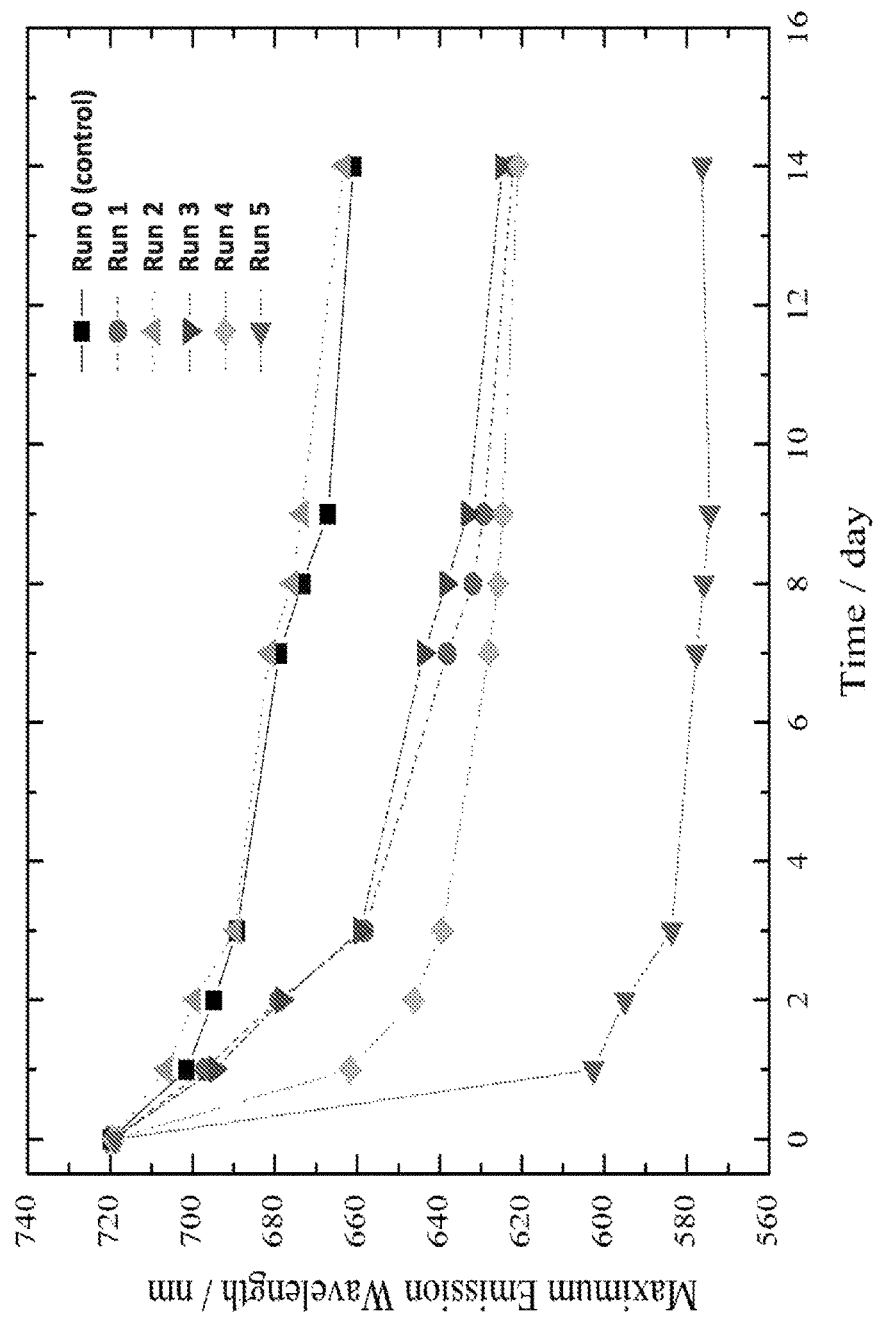
FIG. 2 is a graphical representation of the maximum emission wavelength exhibited by silicon nanoparticle compositions prepared according to the present disclosure plotted as a function of time in various non-ambient conditions.

Referring now to FIG. 2 the maximum emission wavelength exhibited by each silicon nanoparticle composition is plotted as a function of time in the aging or non-ambient environment. The emission of the silicon nanoparticles is shown to blue shift for all cases (Run No.'s 0-5) as the particles oxidize due to oxygen diffusing through the PDMS fluid. The degree of the blue shift that occurs for the silicon nanoparticle composition exposed to non-ambient conditions (Run No.'s 1-5) is greater than that occurs in the control (Run No. 0). The least amount of change for the different non-ambient conditions tested in this Example 1 is the use of "dry" air as shown in the comparison of Run No. 2 with the control (Run No. 0). The rate at which the blue shift occurs in the emission spectrum is similar for Run No.'s 1 and 3 indicating that the presence of water vapor increases the oxidation of the nanoparticles relative to the control (Run No. 0) or dry air (Run No. 2). This example also demonstrates that the application of heat further increases the oxidation rate of the silicon nanoparticles as indicated by the dry heat curve (Run No. 4) in comparison to the dry air curve (Run No. 2), as well as the moist heat curve (Run No. 5) in comparison to the moist atmosphere or air curves (Run No.'s 1 and 3). The highest rate of oxidation (i.e., largest blue shift) occurs when the silicon nanoparticle composition is subjected to a non-ambient moist heat condition (Run No. 5). In each of the Run No.'s 1-5 a substantial change in the maximum emission wavelength results after exposure to the non-ambient condition for greater than about 24 hours, alternatively, greater than about 36 hours, alternatively, greater than about 48 hours with a smaller degree of change occurring even after about 14 days.

Figure 3:
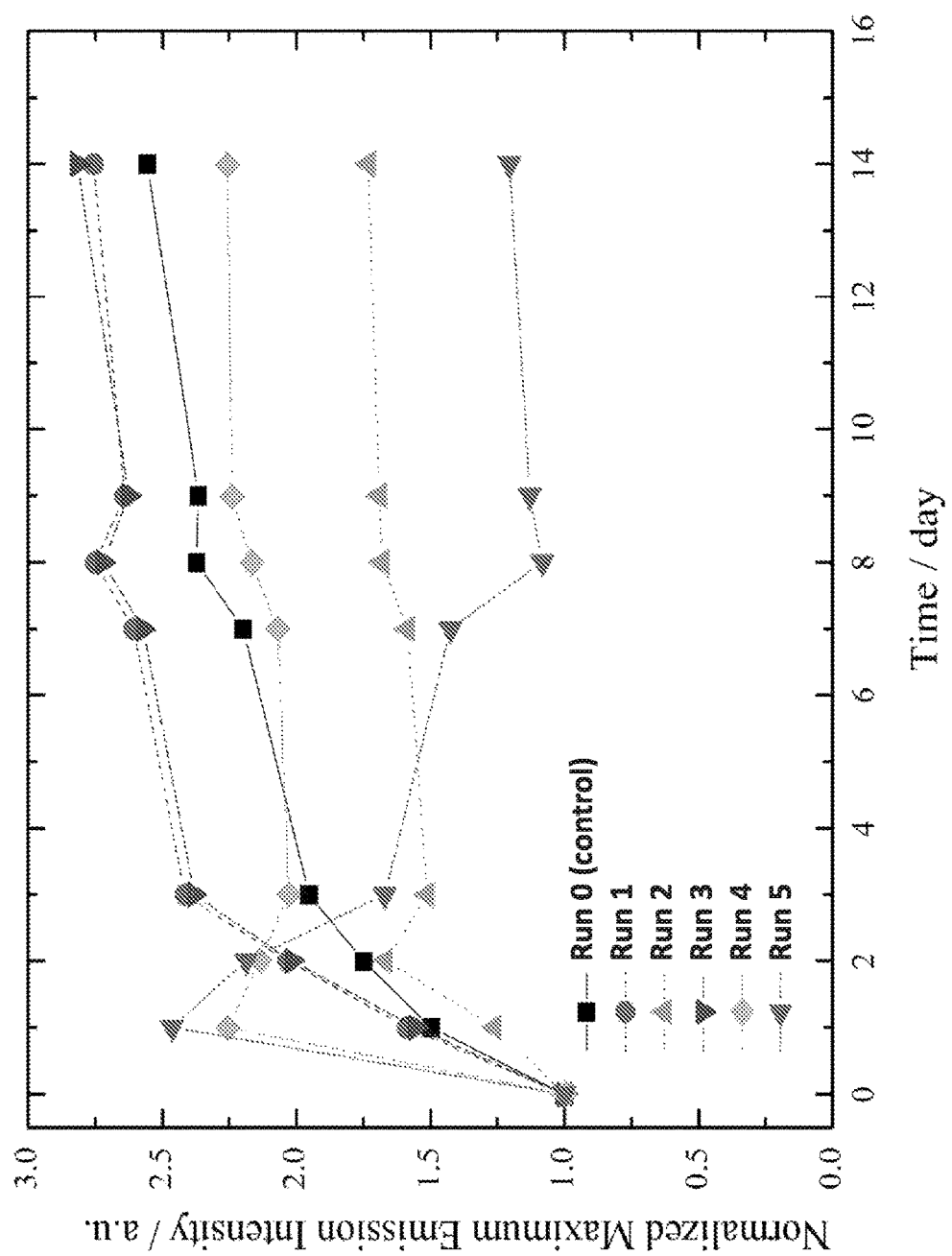
FIG. 3 is a graphical representation of the normalized maximum emission intensity exhibited by silicon nanoparticle compositions prepared according to the teachings of the present disclosure plotted as a function of time that the composition is exposed to the non-ambient condition, i.e., an aging environment.

Referring now to FIG. 3, the normalized maximum emission intensity for each silicon nanoparticle composition from Run No.'s 0-5 is plotted as a function of time in the aging environment. Once again an increase in the maximum emission intensity of the silicon nanoparticle compositions is observed upon exposure to the non-ambient conditions in Run No.'s 1-5. The moist atmosphere (Run No. 1) and moist air (Run No. 3) yield the largest overall increase in maximum emission intensity over the 14 day test period with the heated conditions (Run No.'s 4 and 5) creating the fastest rate of increase as observed within the first 24 hours of exposure. The moist heat condition (Run No. 5) yields the fastest increase in intensity with a higher number of counts, but then the intensity decreases with more aging time indicating there is a maximum exposure time in which this non-ambient condition achieves the maximum emission intensity.

Figure 4:
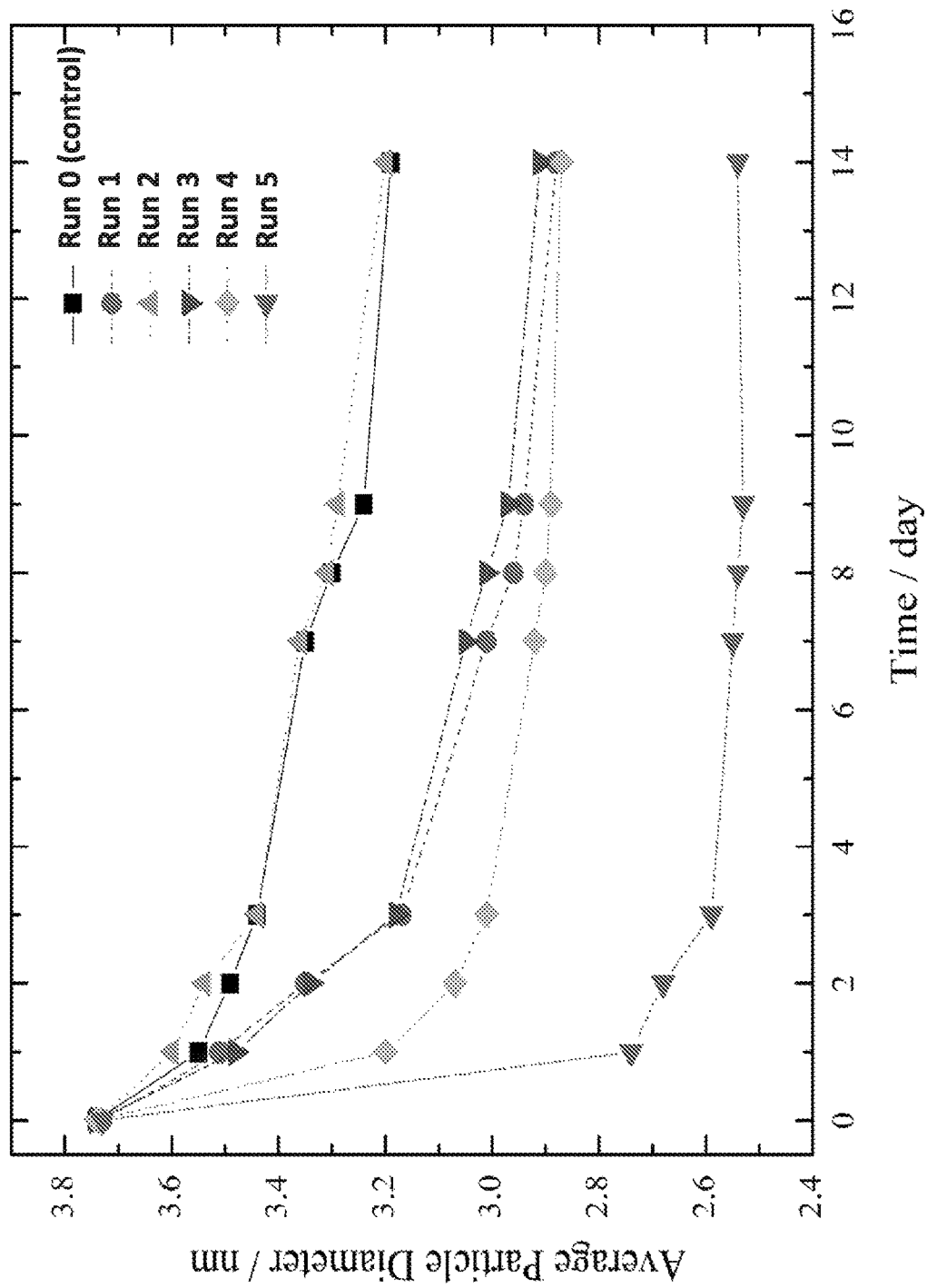
FIG. 4, is a graphical representation of the average particle diameter for the nanoparticles in silicon nanoparticle compositions prepared according to the teachings of the present disclosure plotted as a function of time in which the composition is exposed to the non-ambient or aging condition.

Referring now to FIG. 4, the average particle diameter for the nanoparticles in each silicon nanoparticle composition is plotted as a function of time in which the composition is exposed to the non-ambient or aging condition. The average particle diameter is calculated via transforming the emission spectrum to a particle diameter spectrum and fitting the curves to a log normal distribution as previously described using Equations 2 and 3. In each of the Run No.'s 1-5, the average particle diameter decreases as a function of time. This decrease in average particle diameter is a result of the nanoparticles' surface being oxidized. The magnitude of the decrease in average particle size is smallest with the control (Run No. 0) and for exposure to "dry" air (Run No. 2). The moist heat condition (Run No. 5) yields the greatest decrease in average particle diameter. In fact, the order of decrease in particle size for each of the Run No.'s 1-5 closely matches the shift in the emission spectrum measured for the silicon nanoparticle compositions as shown in FIG. 2.

EXAMPLE 2

A total of 0.01 wt. % of silicon nanoparticles are dispersed in 14 g of 100 cst PDMS under the conditions stated above (see Table 1). In this Example, the silicon nanoparticle composition (Run No. 6) is allowed to stand undisturbed for 21 days prior to exposure to post processing. The silicon nanoparticle composition then underwent a post synthesis plasma treatment using the conditions listed above in Example 1. The silicon nanoparticle composition (Run No. 6) then is placed in a temperature and humidity chamber at 65° C. and 85% relative humidity for 168 hours. Samples are removed and measured with the Fluorolog-2 spectrofluorometer and the Ocean Optics spectrometer or integrating sphere at intervals of 24 hours, 48 hours, 120 hours, 144 hours, and 168 hours of aging in the non-ambient temperature/humidity conditioning chamber.

Figure 5:
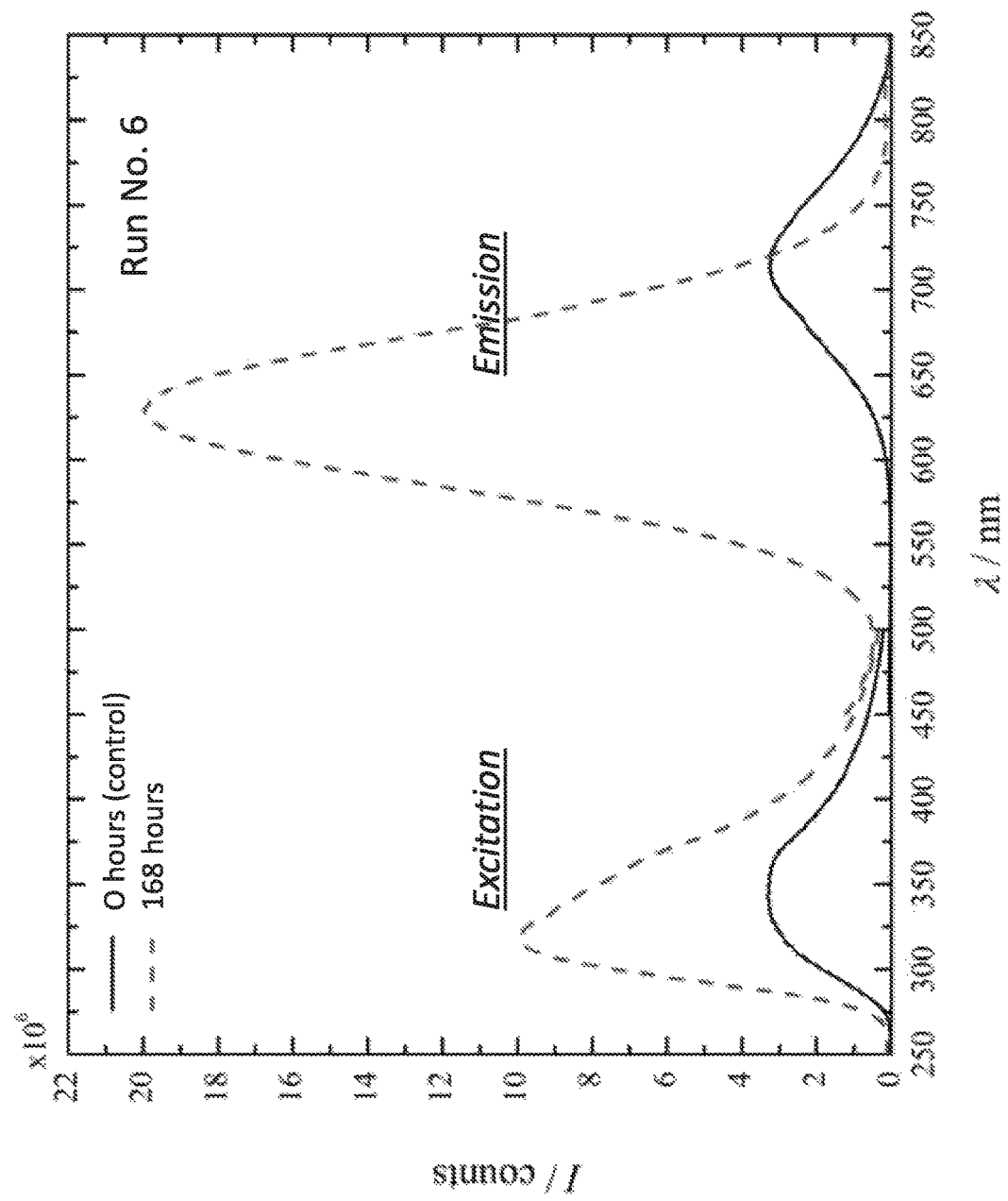
FIG. 5, is a graphical representation of the excitation and emission spectra measured for a silicon nanoparticle composition prior to or before exposure to the non-ambient condition and after exposure to or aging in the non-ambient condition plotted as a function of wavelength.
Figure 6A:
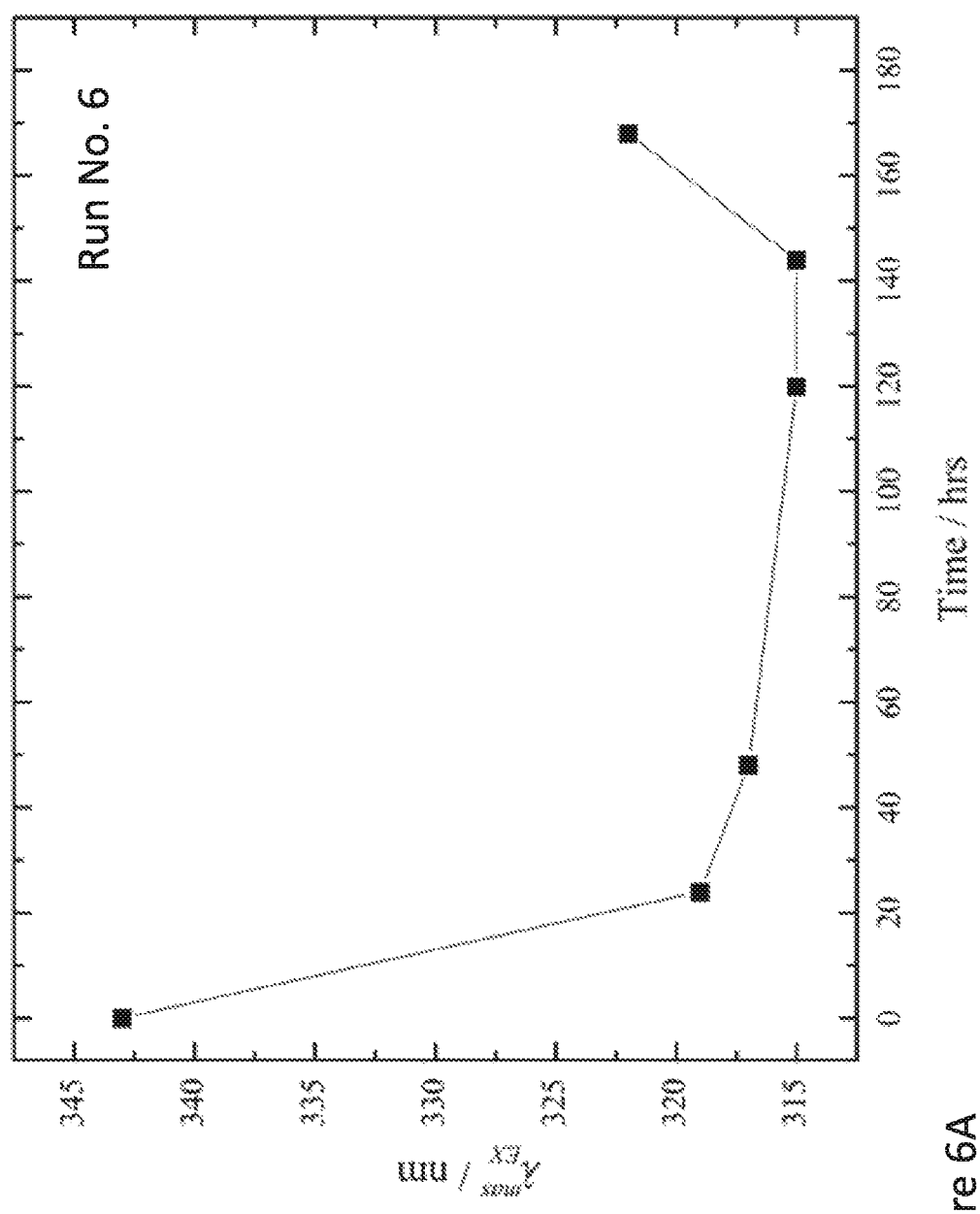
FIGS. 6A-6D are graphical representations of the maximum excitation peak wavelength (FIG. 6A), the maximum emission peak wavelength (FIG. 6B), the maximum emission intensity (FIG. 6C), and the average particle diameter (FIG. 6D) exhibited by a silicon nanoparticle composition plotted as a function of exposure time or aging in a temperature/humidity chamber.
Figure 6B:
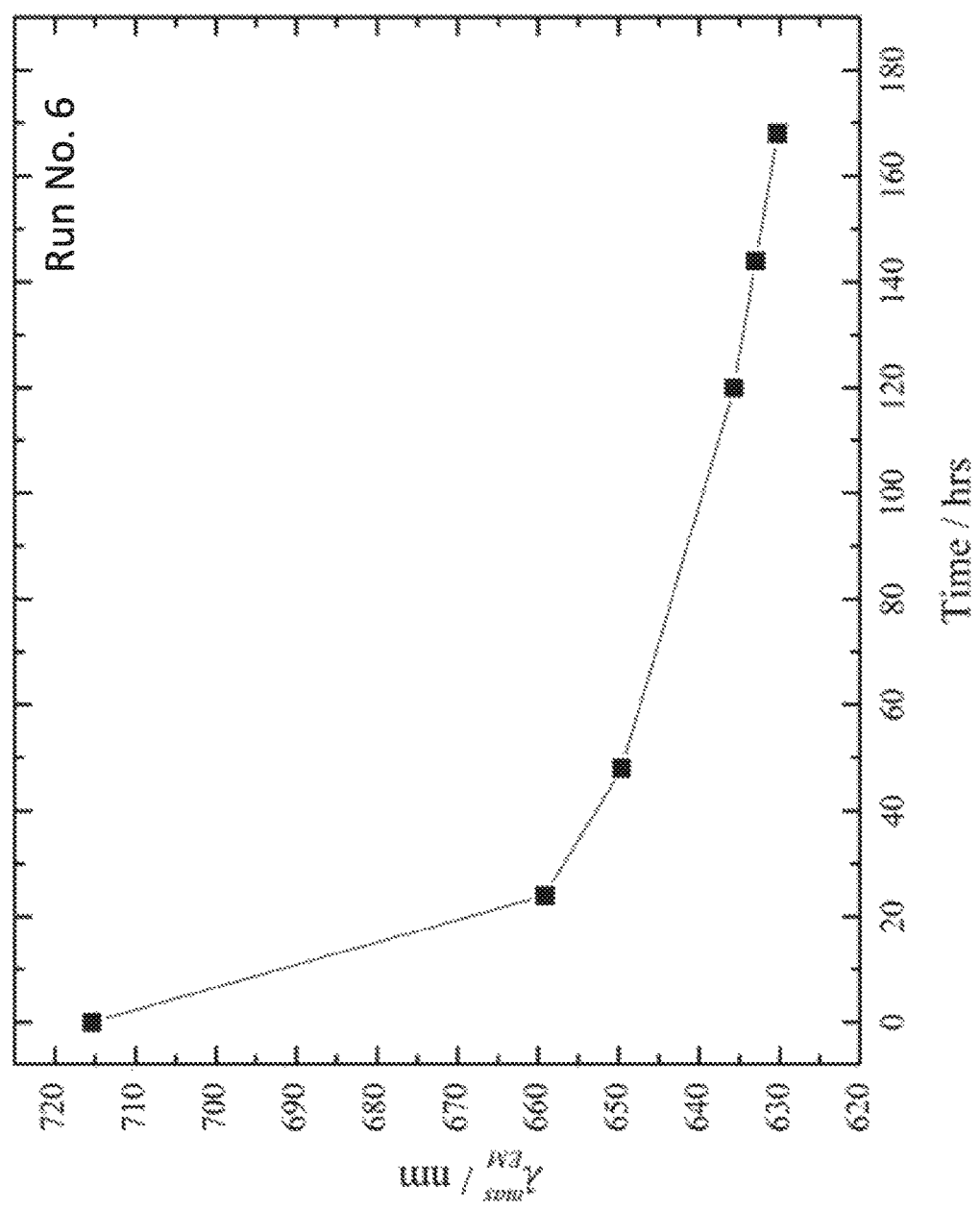
Figure 6C:
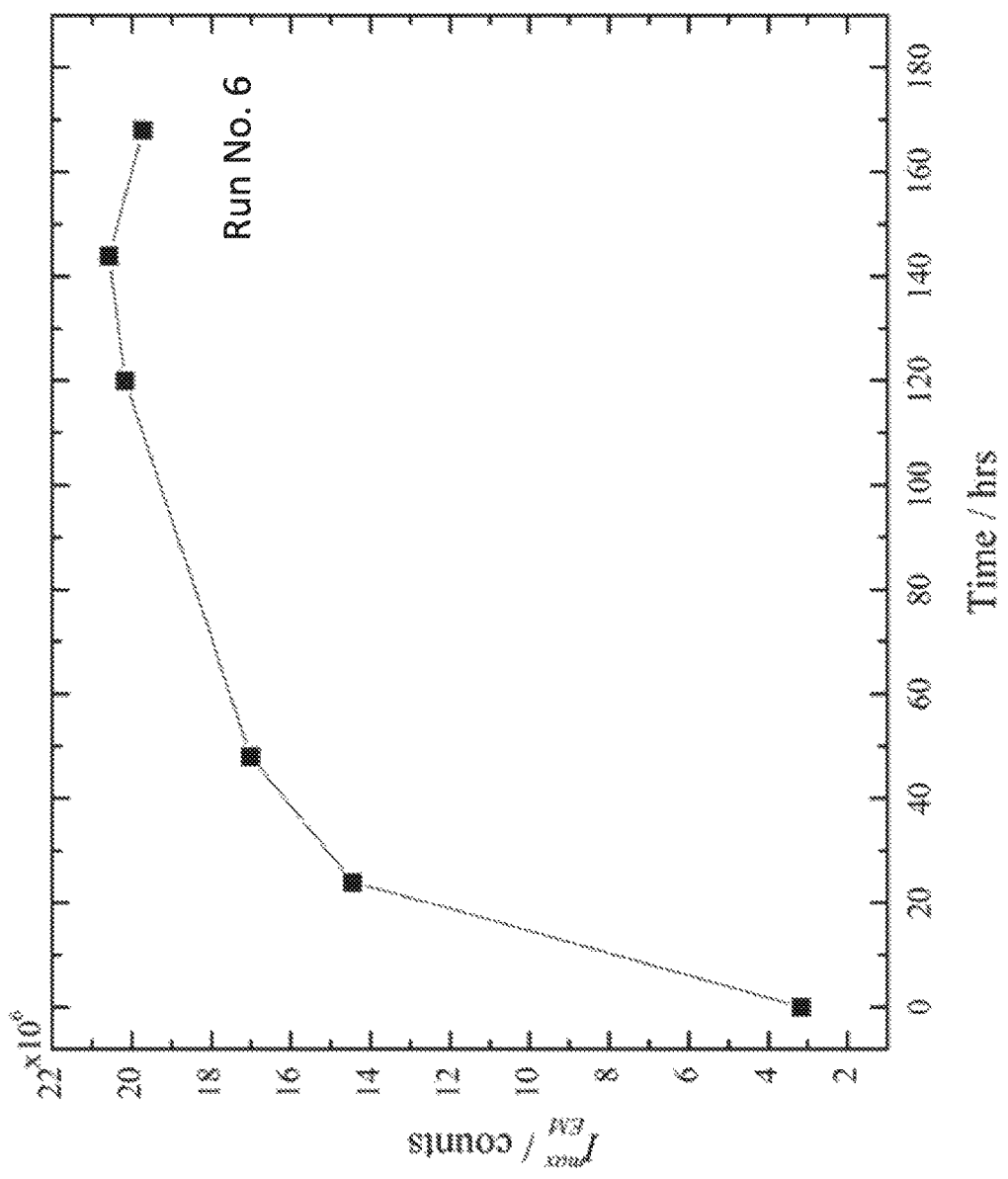
Figure 6D:
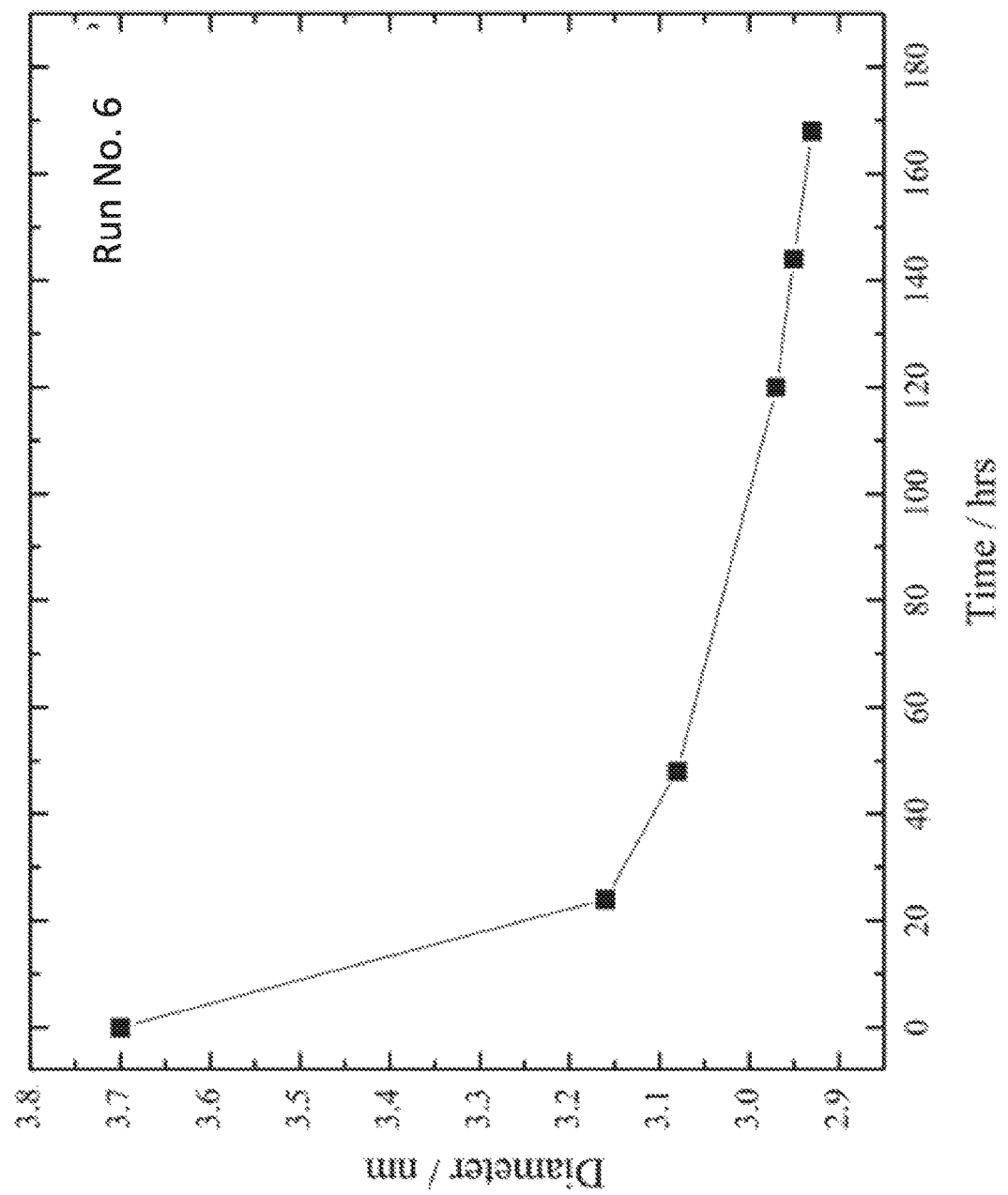

Referring now to FIG. 5, the excitation and emission spectra measured for the silicon nanoparticle composition (Run No. 6) prior to or before exposure to the non-ambient condition (Control, 0 hours) and after exposure to or aging in the non-ambient condition for 168 hours is plotted as a function of wavelength. A noticeable blue shift in wavelength, as well as an increase in intensity is observed for the aged or exposed composition. More specifically, the maximum emission intensity of the exposed composition increases by 567% (3 counts→20 counts) over the maximum emission intensity of the composition prior to exposure to the non-ambient condition.

Referring now to FIGS. 6A-6D, the maximum excitation wavelength, the maximum emission wavelength, the maximum emission intensity, and the average particle diameter exhibited by the silicon nanoparticle composition (Run No. 6) is plotted as a function of exposure time to the non-ambient condition, i.e., aging in the temperature/humidity chamber. The excitation peak (FIG. 6A) exhibited by silicon nanoparticle demonstrates a shift to higher energy during the treatment. The maximum emission wavelength of the silicon nanoparticle composition (FIG. 6B) undergoes a blue shift due to the oxidation of the nanoparticles. The maximum emission intensity of the silicon nanoparticle composition (FIG. 6C) undergoes a six-fold increase as a result of exposure to the non-ambient condition. The average particle diameter calculated from the emission spectrum of the silicon nanoparticles in the composition (FIG. 6D) decreases from about 3.7 nanometers to less than 3.0 nanometers during the aging process.

Figure 7:
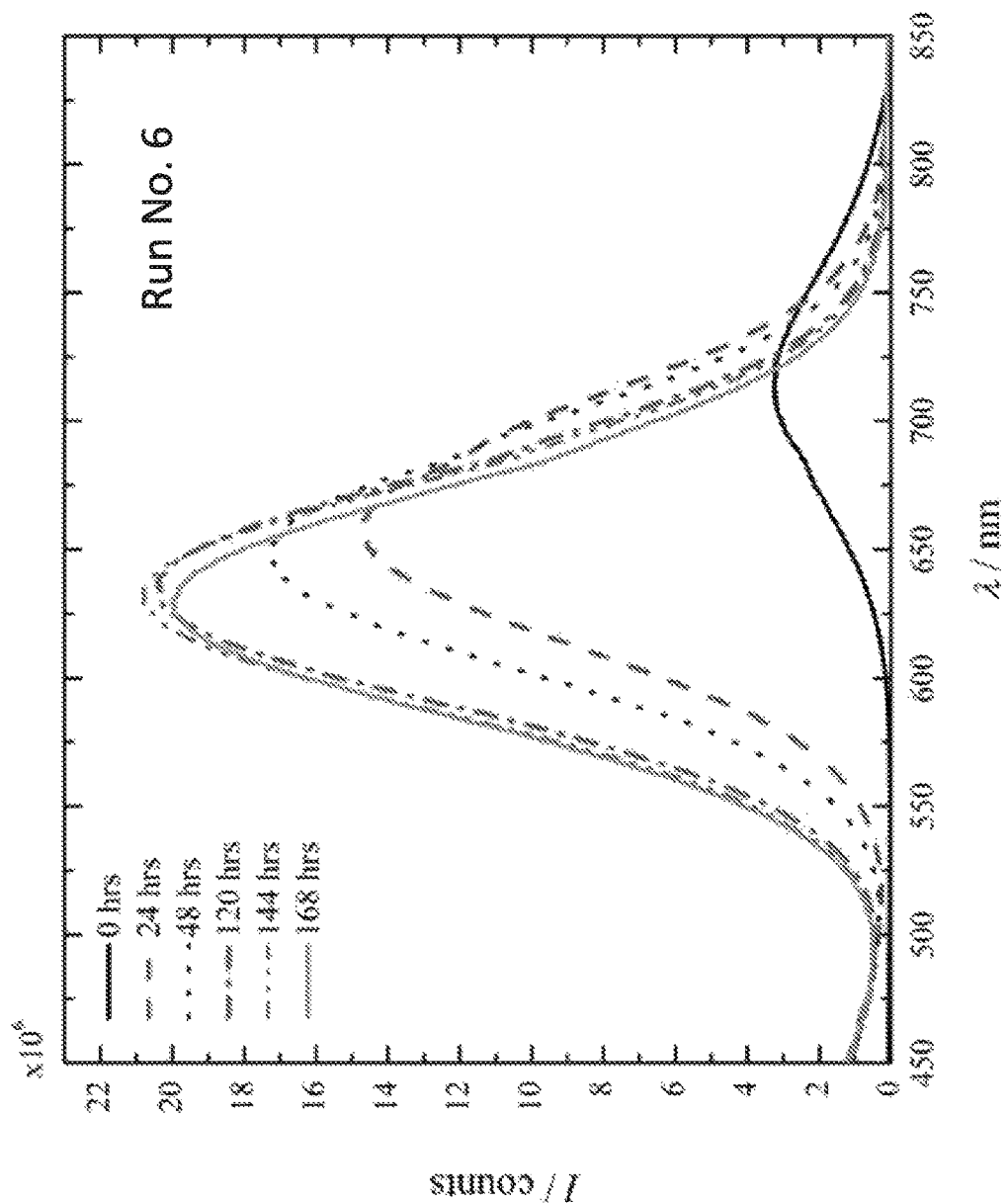
FIG. 7 is a graphical representation of the progressive shift in the emission spectrum exhibited by a silicon nanoparticle composition shown as the non-ambient aging process progresses.

Referring now to FIG. 7, the progressive shift in the emission spectrum exhibited by silicon nanoparticle composition (Run No. 6) is shown as the aging process progresses. A quick blue shift in wavelength and a substantial increase in intensity of the emission occurs (compare 0 hours with 24 hour exposure curves) when the silicon nanoparticle composition is initially exposed to the non-ambient temperature and humidity condition or environment. A much slower increase in maximum emission intensity and shift in wavelength occurs upon continued exposure to the non-ambient condition (see 48-168 hour curves). Overall, the maximum emission intensity of the composition increases by about 350% after 24 hours of exposure; alternatively, about 450% after 48 hours of exposure; and alternatively, about 550% after about 120 hours of exposure.

Figure 8:
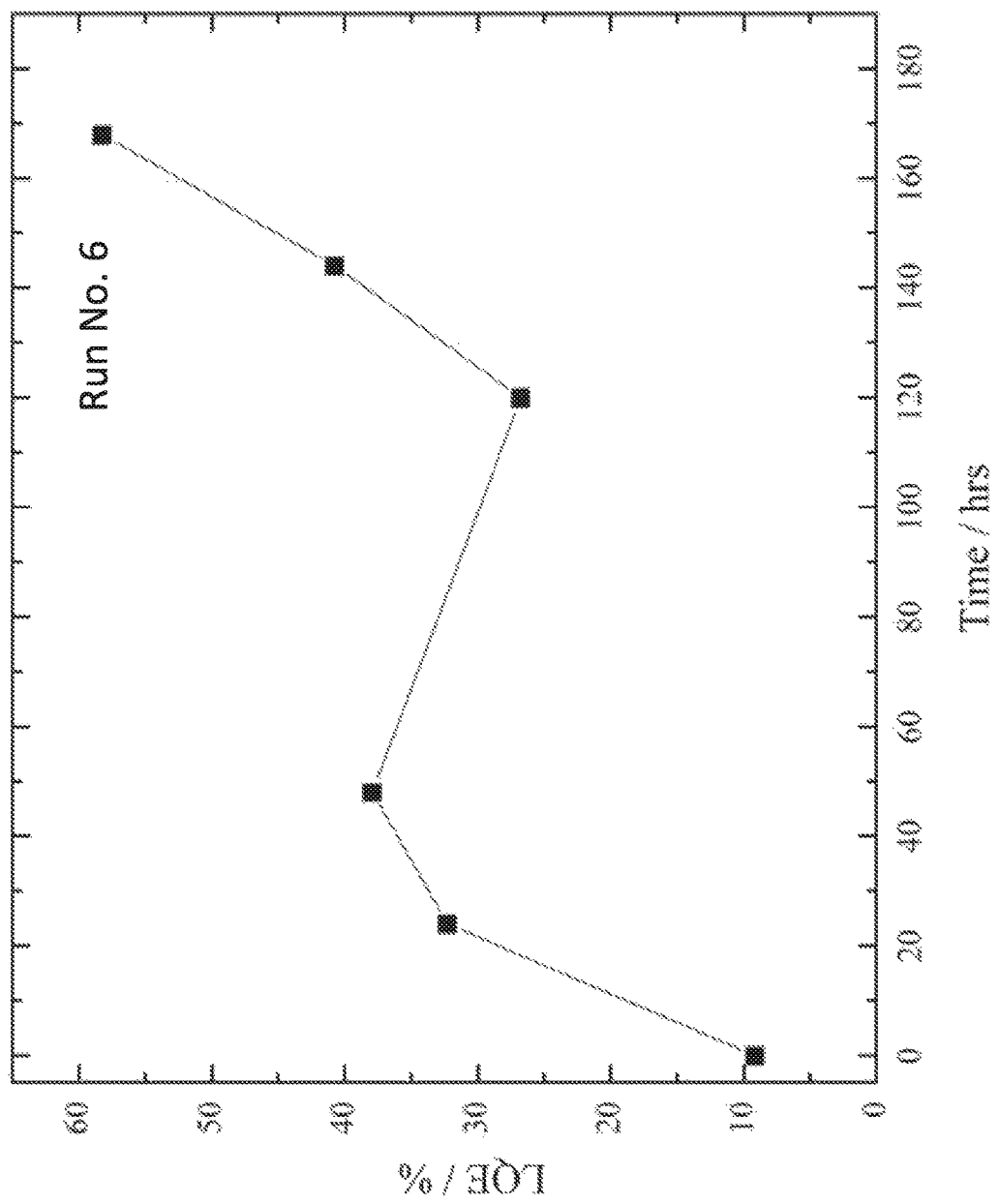
FIG. 8 is a graphical representation of the luminescent quantum efficiency (LQE) of a silicon nanoparticle composition plotted as a function of exposure time or aging in the non-ambient condition.

Referring now to FIG. 8, the luminescent quantum efficiency (LQE) of the silicon nanoparticle composition (Run No. 6) is plotted as a function of exposure time or aging in the non-ambient condition. The LQE is calculated from the spectrum measured using the previously described integrating sphere procedure. A substantial increase in the LQE is observed upon initial exposure of the silicon nanoparticle composition to the non-ambient condition. For example, within the first 24 hours of exposure a 300% increase in luminescent quantum efficiency is observed to occur. Over the entire exposure time (168 hours) to the non-ambient condition approximately a 600% increase in LQE is observed to occur.

EXAMPLE 3

A total of 0.01 wt. % of silicon nanoparticles are dispersed in 14 grams of PDMS (100 cst) under the conditions stated above (see Table 1). In this example the silicon nanoparticle compositions are allowed to sit under ambient conditions for three days prior to any post processing. The silicon nanoparticle compositions in this example are not subjected to the post synthesis plasma treatment as previously described for the compositions in Examples 1 and 2. The silicon nanoparticle composition (Run No. 7) in this example is then placed in a temperature and humidity chamber at 85° C. and 65% relative humidity for 168 hours. Samples are removed and measured with the Fluorolog-2 spectrofluorometer and the Ocean Optics spectrometer or integrating sphere at intervals of 24 hours, 48 hours, 72 hours, 96 hours, and 168 hours of aging in the non-ambient temperature/humidity conditioning chamber.

Figure 9:
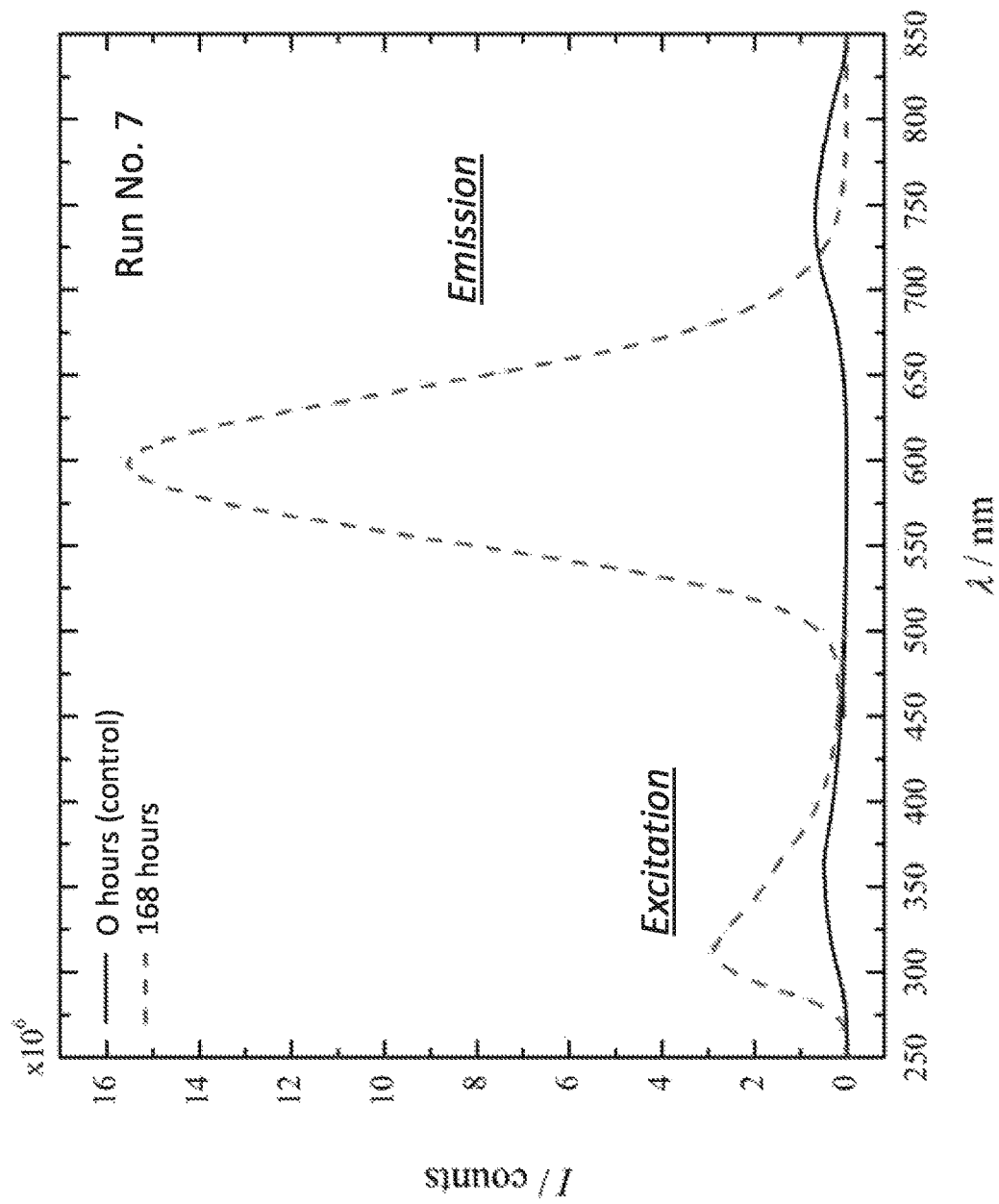
FIG. 9 is a graphical representation of the excitation and emission spectra measured for another silicon nanoparticle composition prior to or before exposure to the non-ambient condition and after exposure to or aging in the non-ambient condition plotted as a function of wavelength.
Figure 10A:
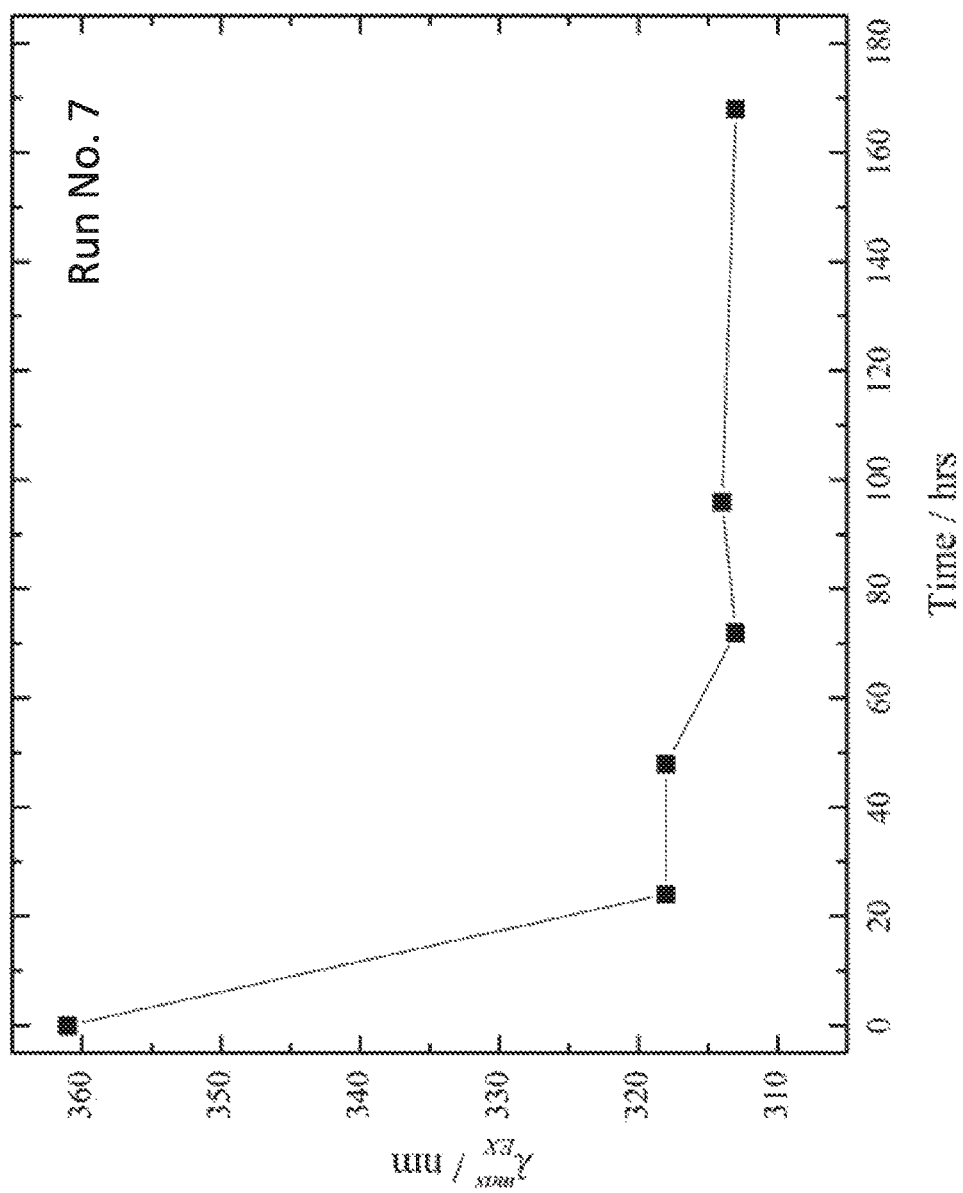
FIGS. 10A-10D are graphical representations of the maximum excitation peak wavelength (FIG. 10A), the maximum emission peak wavelength (FIG. 10B), the maximum emission intensity (FIG. 10C), and the average particle diameter (FIG. 10D) exhibited by another silicon nanoparticle composition plotted as a function of exposure time to the non-ambient condition or aging in the temperature/humidity chamber.
Figure 10B:
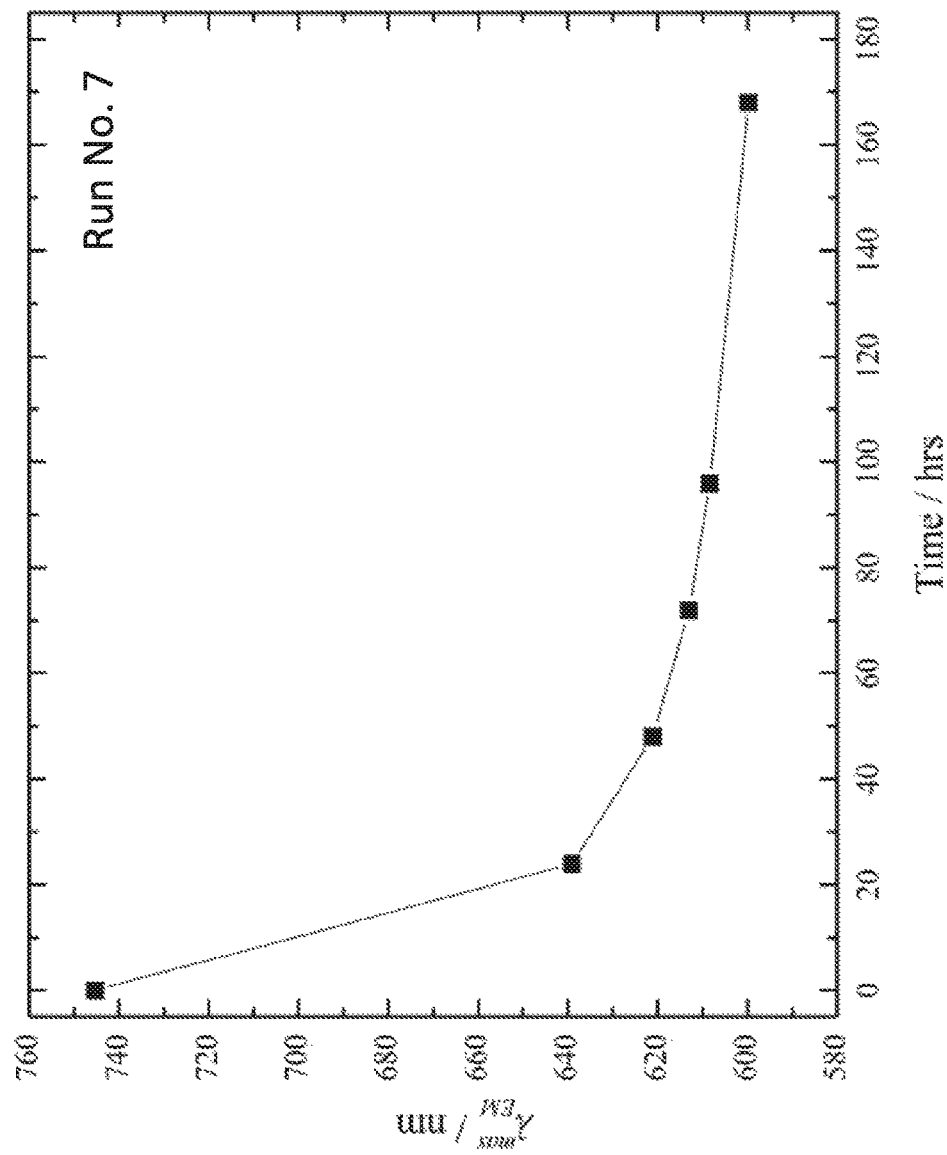
Figure 10C:
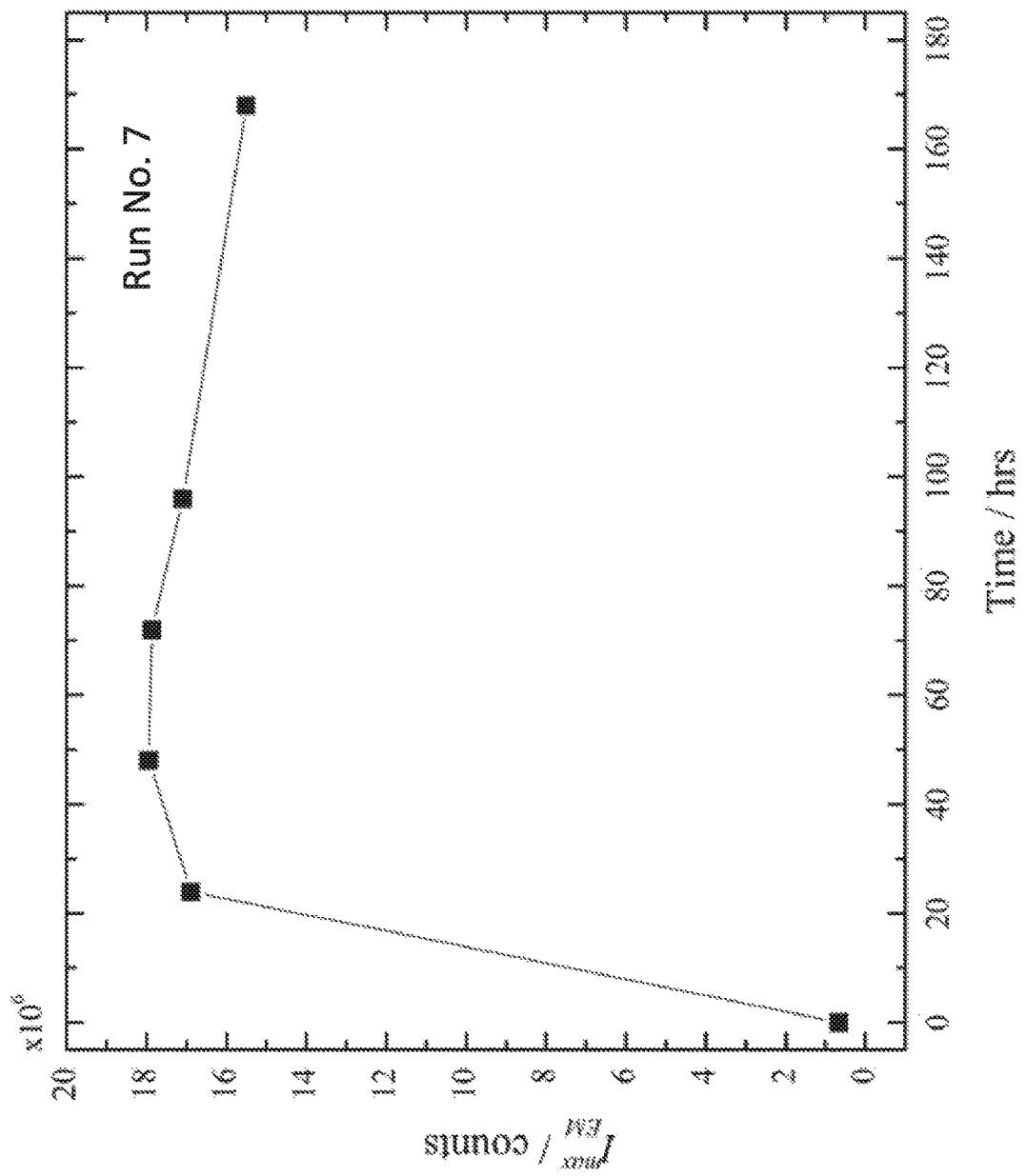
Figure 10D:
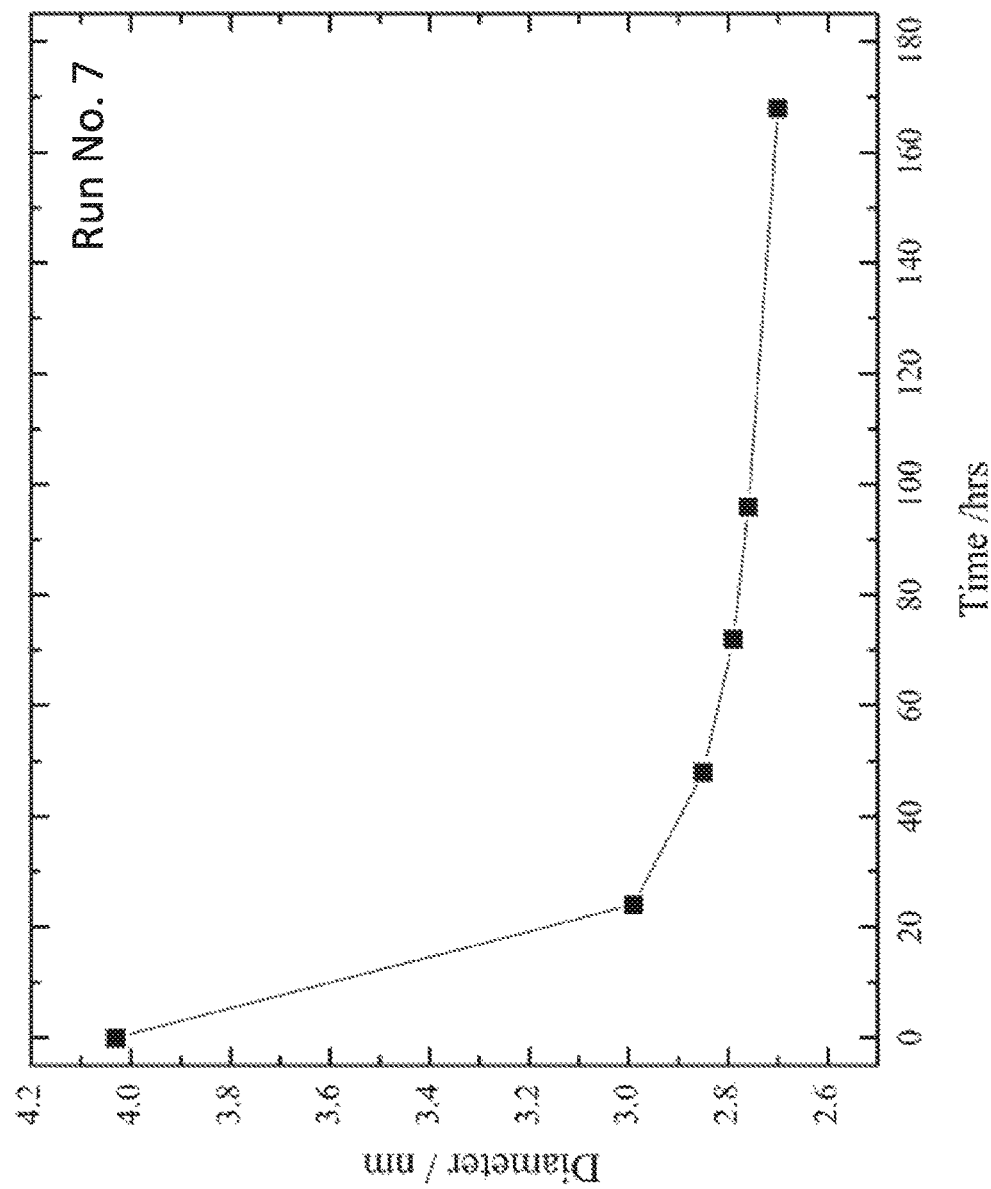

Referring now to FIG. 9, the excitation and emission spectra measured for the silicon nanoparticle composition (Run No. 7) prior to or before exposure to the non-ambient condition (Control, 0 hours) and after exposure to or aging in the non-ambient condition for 168 hours is plotted as a function of wavelength. A noticeable blue shift in wavelength, as well as an increase in intensity is observed for the aged silicon nanoparticle composition.

Referring now to FIGS. 10A-10D, the maximum excitation wavelength, the maximum emission wavelength, the maximum emission intensity, and the average particle diameter exhibited by the silicon nanoparticle composition (Run No. 7) is plotted as a function of exposure time to the non-ambient condition, i.e., aging in the temperature/humidity chamber. The excitation peak (FIG. 10A) exhibited by silicon nanoparticle demonstrates a shift to higher energy during the treatment. The maximum emission wavelength of the silicon nanoparticle composition (FIG. 10B) undergoes a blue shift due to the oxidation of the nanoparticles. The maximum emission intensity of the silicon nanoparticle composition (FIG. 10C) undergoes a seventeen-fold increase as a result of exposure to the non-ambient condition. The average particle diameter calculated from the emission spectrum of the silicon nanoparticles in the composition (FIG. 10D) decreases from greater than 4.0 nanometers to less than 2.8 nanometers during the aging process.

Figure 11:
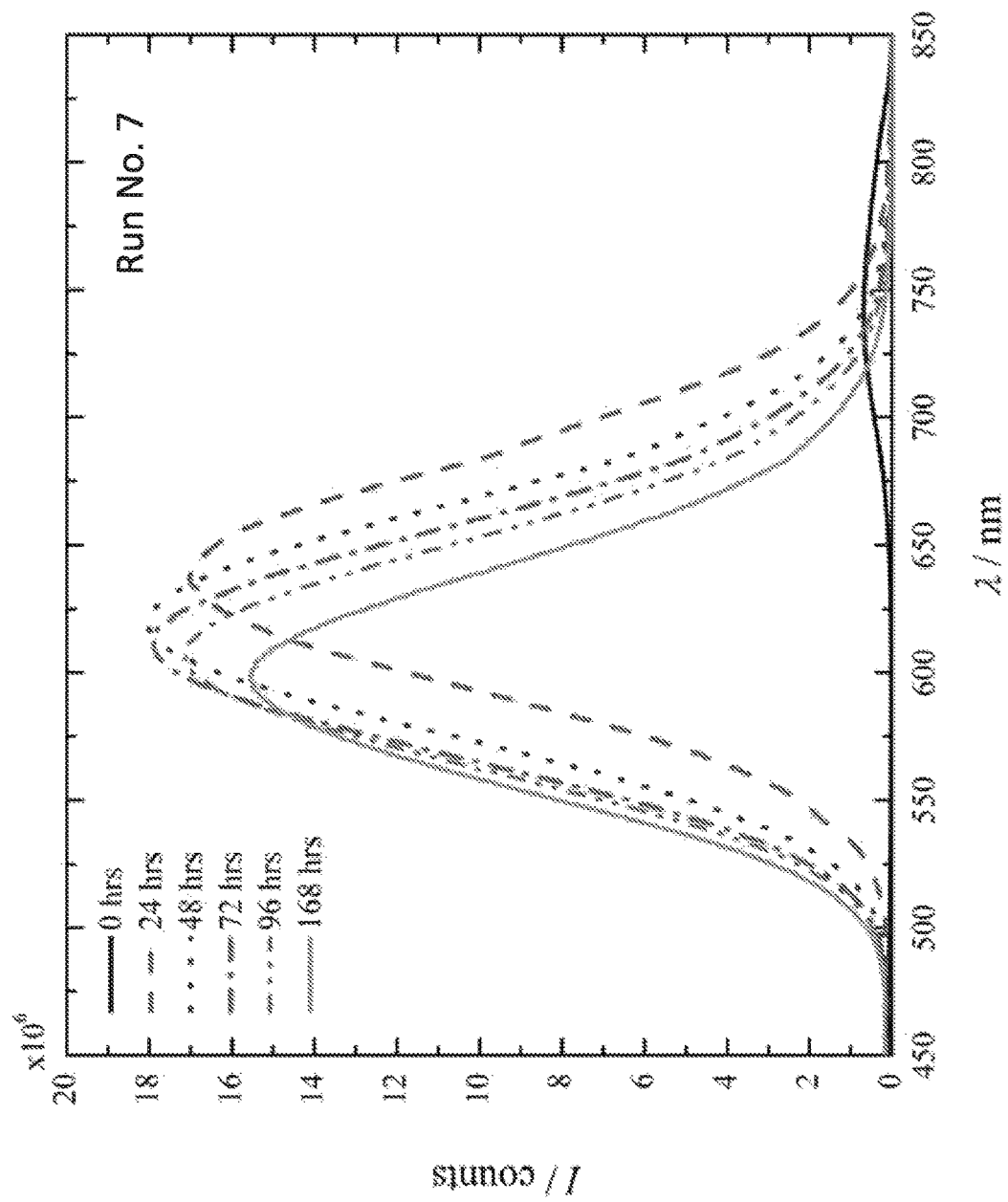
FIG. 11 is a graphical representation of the progressive shift in the emission spectrum exhibited by another silicon nanoparticle composition shown as the non-ambient aging process progresses.

Referring now to FIG. 11, the progressive shift in the emission spectrum exhibited by silicon nanoparticle composition (Run No. 7) is shown as the aging process progresses. A quick blue shift in wavelength and a substantial increase in intensity of the emission occurs (compare 0 hours with 24 hour exposure curves) when the silicon nanoparticle composition is initially exposed to the non-ambient temperature and humidity condition or environment. A much slower shift in wavelength occurs upon continued exposure to the non-ambient condition (see 48-168 hour curves). The intensity of the emission increases until 48-72 hours exposure and then slightly decreases upon further exposure to the non-ambient condition (see 96-168 hour curves). Overall, the maximum emission intensity of the composition increases by about 1700% (1 count→18 counts) after 72 hours of exposure.

Figure 12:
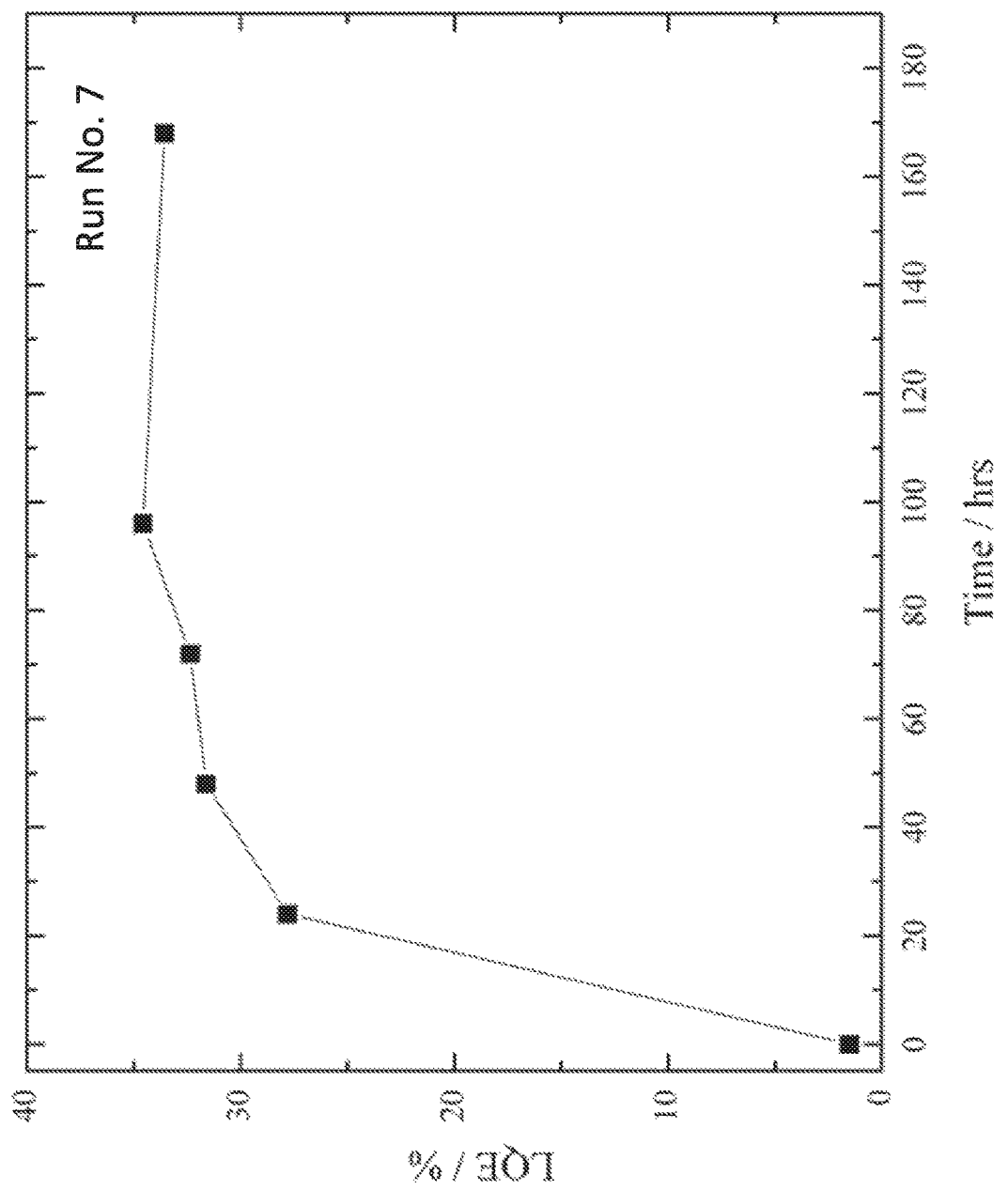
FIG. 12 is a graphical representation of the luminescent quantum efficiency (LQE) of another silicon nanoparticle composition plotted as a function of exposure time or aging in the non-ambient condition.

Referring now to FIG. 12, the luminescent quantum efficiency (LQE) of the silicon nanoparticle composition (Run No. 7) is plotted as a function of exposure time or aging in the non-ambient condition. The LQE is calculated from the spectrum measured using the previously described integrating sphere procedure. A substantial increase in the LQE is observed upon initial exposure of composition to the non-ambient condition. For example, within the first 24 hours of exposure approximately a 300% increase in luminescent quantum efficiency is observed to occur. However, over the entire exposure time (168 hours) to the non-ambient condition approximately only a 350% increase in LQE is observed to occur. The overall increase in luminescent quantum efficiency for this silicon nanoparticle composition (Run No. 7) without exposure to the post plasma hydrogen treatment is smaller than the overall increase in LQE observed for the silicon nanoparticle composition (Run No. 6, see FIG. 8) that is exposed to the post plasma treatment. This result is most likely due to the hydrogen treatment being capable of passivating the defects associated with the initial oxide that is formed upon exposure to the non-ambient condition. The post plasma hydrogen treatment creates atomic hydrogen that diffuses into the PDMS and can passivate defects, such as $P_b$, $P_{b0}$, and $P_{b1}$ defects, that may occur at a silicon/silicon oxide interface.

EXAMPLE 4

A total of 0.03 wt. % silicon nanoparticles are dispersed in PDMS (100 cst) under the conditions stated above (see Table 1). In this example, the silicon nanoparticle composition (Run No. 8) is stored in a nitrogen filled glove box to limit exposure to air (i.e., oxygen). Then a portion (i.e., about 60 ml) of the composition is placed in a pressure reactor and pressurized to 1500 psig ($1.044 \times 10^7$ Pa) with ultrahigh purity $O_2$ gas. In the presence of this non-ambient condition, the composition is stirred at 600 rpm and held at 40° C. for 168 hrs.

Figure 13:
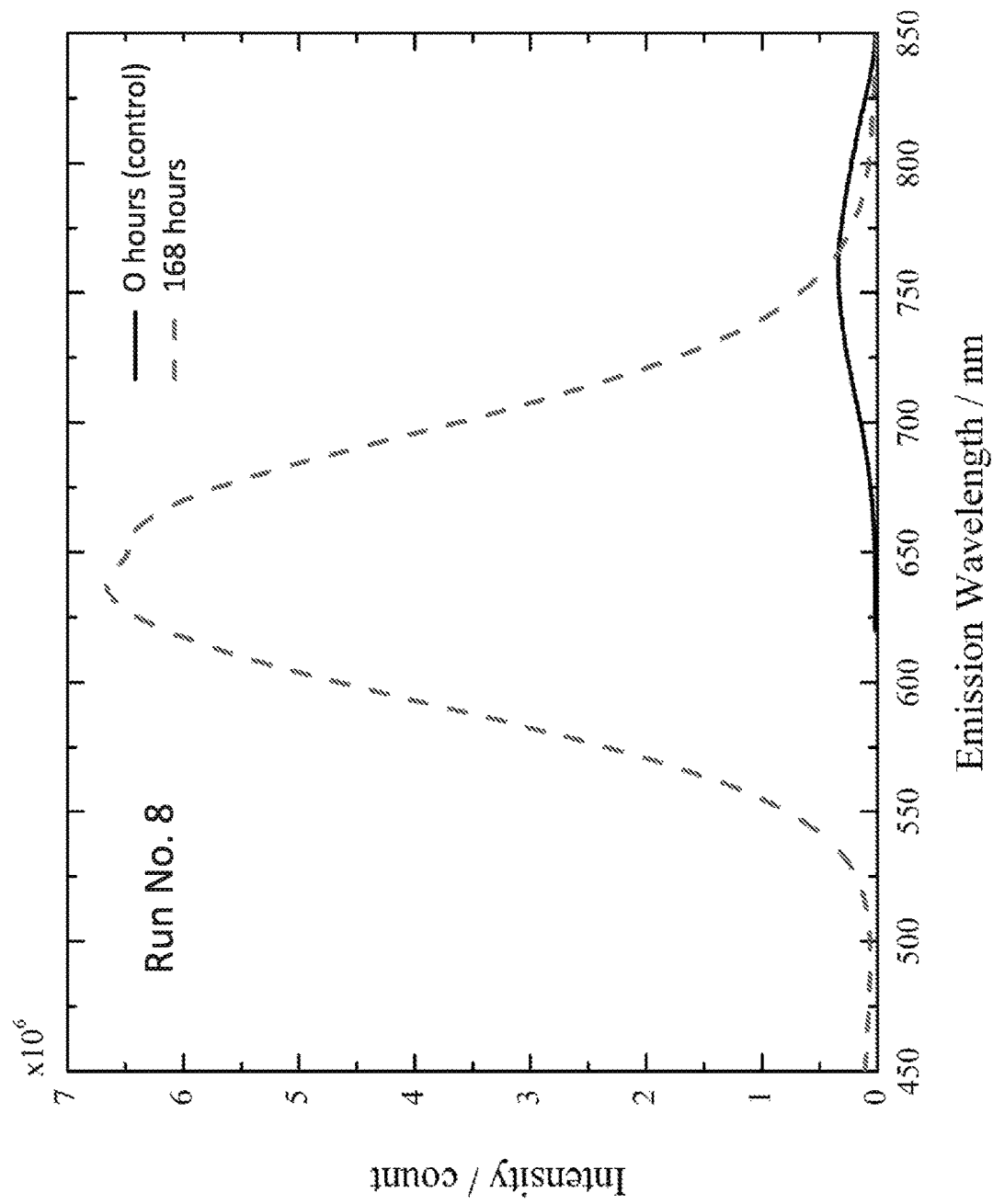
FIG. 13 is a graphical representation of the emission spectra measured for another silicon nanoparticle composition prior to or before exposure to the non-ambient condition and after exposure to or aging in the non-ambient condition plotted as a function of wavelength.

Referring now to FIG. 13, the emission spectra measured for the silicon nanoparticle composition (Run No. 8) prior to or before exposure to the non-ambient condition (Control, 0 hours) and after exposure to or aging in the non-ambient condition for 168 hours is plotted as a function of wavelength. A noticeable blue shift in wavelength, as well as an increase in intensity is observed for the aged composition. The blue shift and increase in intensity, signifies the occurrence of oxidation related to the surface of the particles in the fluid, while still retaining strong luminescence.

EXAMPLE 5

A total of 0.03 wt. % silicon nanoparticles are dispersed in PDMS (100 cst) under the conditions stated above (see Table 1). In this example, the silicon nanoparticle composition (Run No. 9) is stored in a nitrogen filled glove box to limit exposure to air (i.e., oxygen). Then a portion of the composition is placed in a pressure reactor and pressurized to 190 psig ($1.411 \times 10^6$ Pa) with ultrahigh purity $O_2$ gas. In the presence of this non-ambient condition, the composition is stirred at 600 rpm and held at 60° C. for 3 hrs.

Figure 14:
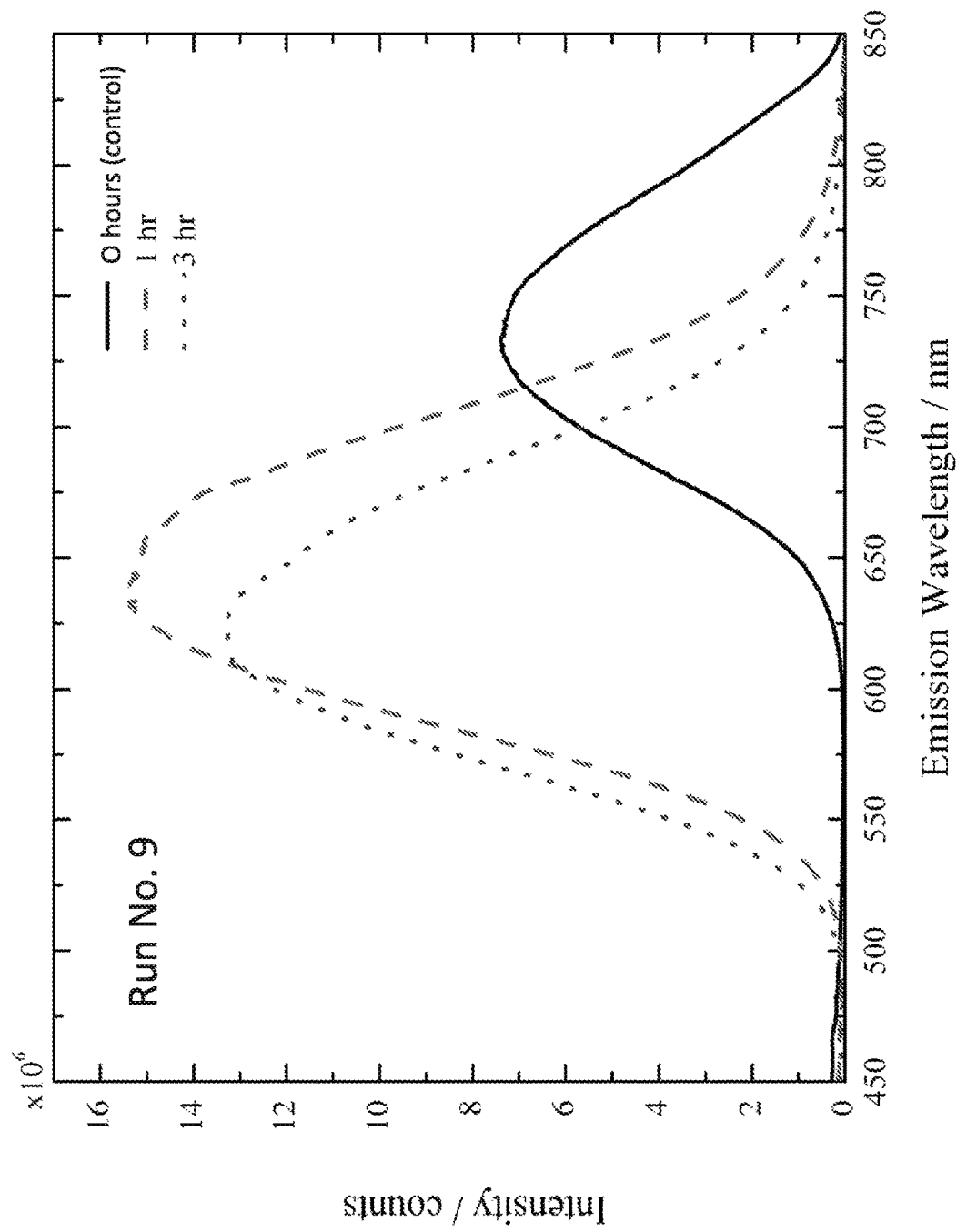
FIG. 14 is a graphical representation of the emission spectra measured for another silicon nanoparticle composition prior to or before exposure to the non-ambient condition and after exposure to or aging in the non-ambient condition for 1 hour and 3 hours plotted as a function of wavelength.

Referring now to FIG. 14, the emission spectra measured for the silicon nanoparticle composition (Run No. 9) prior to or before exposure to the non-ambient condition (Control, 0 hours) and after exposure to or aging in the non-ambient condition for 1 hour and 3 hours is plotted as a function of wavelength. A noticeable blue shift in wavelength, as well as an increase in maximum emission intensity is observed for the aged composition. More specifically, maximum emission intensity is observed to increase by about 125% after 1 hour exposure of the composition to the non-ambient condition as shown in comparison to the emission intensity of the initial sample (0 hours exposure). A slight decrease then occurs upon continued exposure (compare 1 hour and 3 hour curves).

EXAMPLE 6

A total of 0.03 wt. % silicon nanoparticles are dispersed in PDMS (100 cst) under the conditions stated above (see Table 1). In this example, the silicon nanoparticle composition (Run No. 10) is stored in a nitrogen filled glove box to limit exposure to air (i.e., oxygen). Then a portion (i.e., 60 ml) of the composition is placed in a pressure reactor and pressurized to 190 psig ($1.411 \times 10^6$ Pa) with ultrahigh purity $O_2$ gas. In the presence of this non-ambient condition, the composition is stirred at 600 rpm and held at 120° C. for 3 hours.

Figure 15:
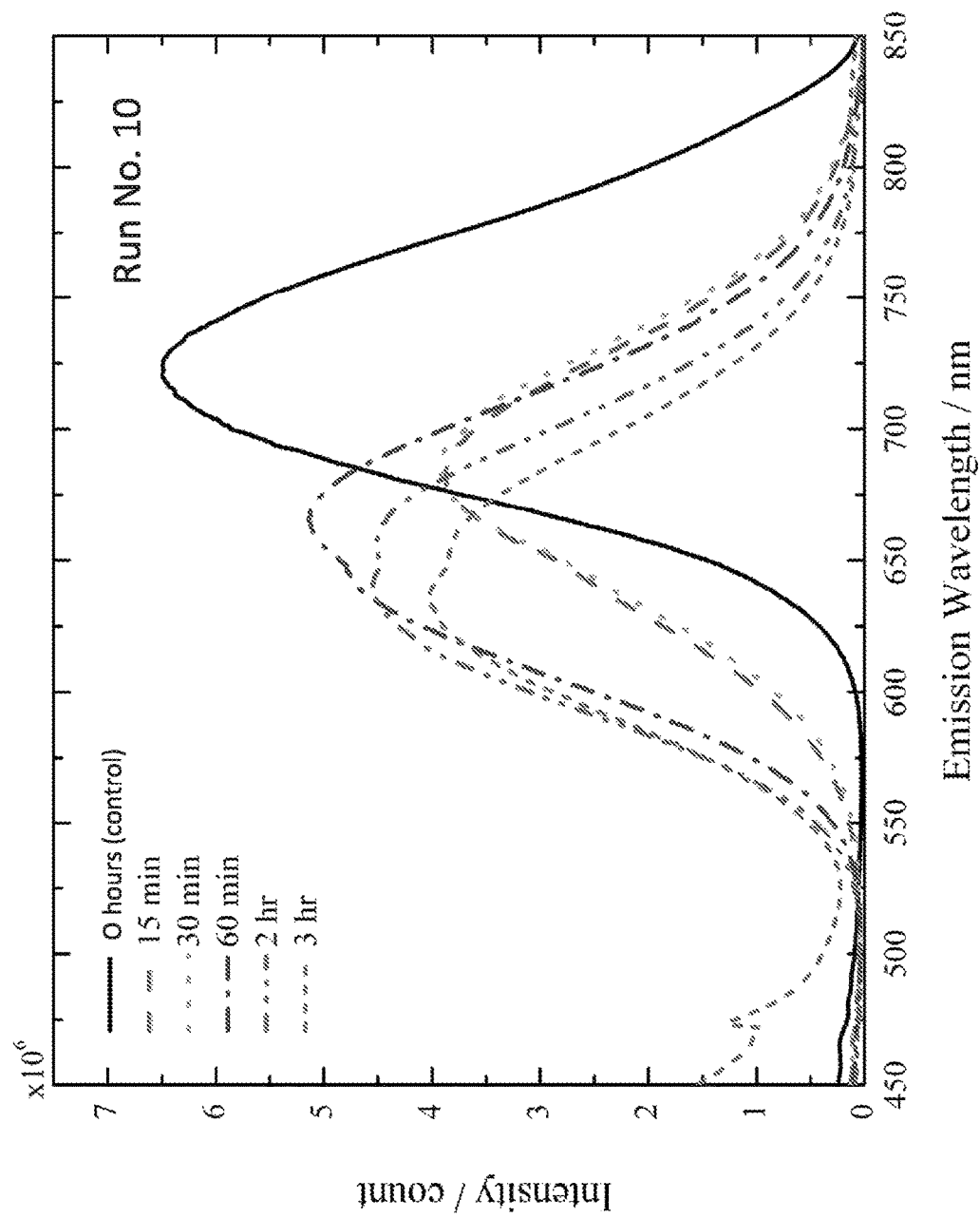
FIG. 15 is a graphical representation of the emission spectra measured for another silicon nanoparticle composition prior to or before exposure to the non-ambient condition and after exposure to or aging in the non-ambient condition for 15 minutes, 30 minutes, 1 hour, 2 hours, and 3 hours plotted as a function of wavelength.

Referring now to FIG. 15, the emission spectra measured for the silicon nanoparticle composition (Run No. 10) prior to or before exposure to the non-ambient condition (Control, 0 hours) and after exposure to or aging in the non-ambient condition for 15 minutes, 30 minutes, 1 hour, 2 hours, and 3 hours is plotted as a function of wavelength. A noticeable blue shift in wavelength is observed for the aged composition. At this higher exposure temperature (Run No. 10), the overall emission intensity decreases as compared to exposure of a similar composition (Run No. 9, Example 5) to a lower exposure temperature. In addition, the maximum intensity for Run No. 10 is observed to occur at 1 hour, even though in this case the overall measured intensity is lower than the initial intensity exhibited by the silicon nanoparticle composition (control, 0 hours).

EXAMPLE 7

A total of 0.03 wt. % silicon nanoparticles are dispersed in PDMS (100 cst) under the conditions stated above (see Table 1). In this example, the silicon nanoparticle composition (Run No. 11) is stored in a nitrogen filled glove box to limit exposure to air (i.e., oxygen). Then a portion (i.e., 60 ml) of the composition is placed in a pressure reactor and pressurized to 190 psig ($1.411 \times 10^6$ Pa) with ultrahigh purity $O_2$ gas. In the presence of this non-ambient condition, the composition is stirred at 600 rpm and held at 140° C. for 10 minutes, creating a pressure of 25 psig ($2.737 \times 10^5$ Pa).

Figure 16:
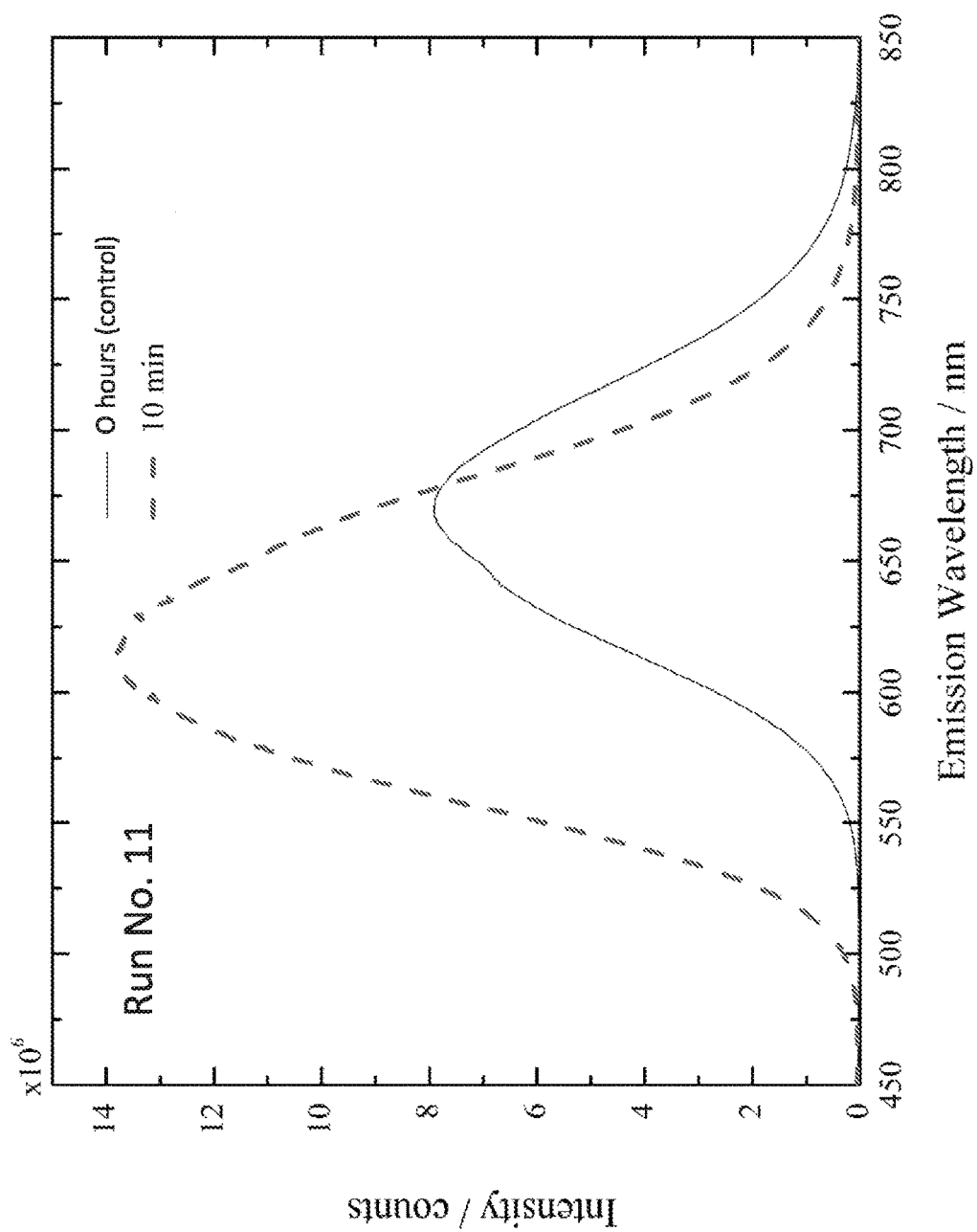
FIG. 16 is a graphical representation of the emission spectra measured for another silicon nanoparticle composition prior to or before exposure to the non-ambient condition and after exposure to or aging in the non-ambient condition plotted as a function of wavelength.

Referring now to FIG. 16, the emission spectra measured for the silicon nanoparticle composition (Run No. 11) prior to or before exposure to the non-ambient condition (control, 0 hours) and after exposure to or aging in the non-ambient condition for 10 minutes is plotted as a function of wavelength. A noticeable blue shift in wavelength, as well as an increase in maximum emission intensity of about 75% (8 counts→14 counts) is observed for the aged composition over the short interval of exposure to the non-ambient condition.

The foregoing description of various embodiments of the invention has been presented for purposes of illustration and description. It is not intended to be exhaustive or to limit the invention to the precise embodiments disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:
1. A method of improving the photoluminescence of silicon nanoparticles, the method comprising:
providing a silicon nanoparticle composition comprising silicon nanoparticles having a mean particle diameter not greater than 5 nm dispersed in a fluid; and exposing the silicon nanoparticle composition to a non-ambient condition selected from at least two of: (i) elevated temperature, (ii) elevated humidity, (iii) elevated pressure exerted by an oxygen-containing gas, (iv) a hydrogen plasma, and (v) molecular hydrogen, for a time sufficient to enhance the photoluminescence of the composition;

wherein: (i) elevated temperature is from slightly above ambient temperature to a boiling point temperature of the capture fluid; (ii) elevated humidity is from about 30% relative humidity up to 100% relative humidity; and (iii) elevated pressure is from greater than atmospheric pressure to 4,000 psig.

2. The method according to claim 1, wherein the method further comprises preparing the silicon nanoparticles by a gas phase reaction.

3. The method according to claim 1, wherein the silicon nanoparticle composition has a maximum emission intensity after exposure to the non-ambient condition that is larger than the maximum emission intensity of the silicon nanoparticle composition prior to exposure to the non-ambient condition when excited by light having a wavelength of from 190 to 600 nm.

4. The method according to claim 1, further comprising, before exposing the silicon nanoparticle composition to the non-ambient condition, subjecting the silicon nanoparticle composition to ambient temperature, pressure, relative humidity, and air.

5. The method according to claim 1, wherein the non-ambient condition is elevated temperature and elevated humidity or hydrogen plasma.

6. The method according to claim 5, wherein the elevated temperature is from above ambient temperature up to the boiling point of the fluid; and the elevated humidity is from 30 to 100% relative humidity (RH).

7. The method according to claim 1, wherein the non-ambient condition is a combination of elevated temperature and elevated pressure exerted by an oxygen-containing gas.

8. The method according to claim 1, wherein the fluid comprises a silicone fluid selected from polydimethylsiloxane, phenylmethyl dimethyl cyclosiloxane, tetramethyltetraphenyl-trisiloxane, pentaphenyltrimethyltrisiloxane, and mixtures or compositions thereof.

9. The method according to claim 1, wherein the exposed silicon nanoparticle composition has maximum emission intensity at a wavelength that is between 1.1 and 1.5 times greater than an excitation wavelength of from 190 to 600 nm.

10. The method according to claim 1, wherein the silicon nanoparticle composition is prepared by forming silicon nanoparticles in a low pressure high frequency pulsed plasma reactor and collecting the nanoparticles in a capture fluid in the reactor.

11. The method according to claim 1, wherein the silicon nanoparticle composition has after exposure to the non-ambient condition a maximum emission wavelength of from 460 to 1100 nm at an excitation wavelength of from 250 to 450 nm.

12. The method according to claim 3, wherein the maximum emission intensity of the silicon nanoparticle composition after exposure to the non-ambient condition is at least 75% greater than the maximum emission intensity of the silicon nanoparticle composition prior to exposure to the non-ambient condition.

13. The method according to claim 1, wherein the silicon nanoparticle composition has a luminescent quantum efficiency after exposure to the non-ambient condition that is at least 100% larger than the luminescent quantum efficiency of the composition prior to exposure to the non-ambient condition.

14. A method of improving the photoluminescence of silicon nanoparticles, the method comprising:

forming silicon nanoparticles in a low pressure high frequency pulsed plasma reactor and collecting the nanoparticles in a capture fluid in the reactor to give a silicon nanoparticle composition comprising silicon nanoparticles having a mean particle diameter not greater than 5 nm dispersed in the fluid;

exposing the silicon nanoparticle composition to ambient temperature, pressure, relative humidity, and air; and exposing the silicon nanoparticle composition to a non-ambient condition selected from at least two of: (i) elevated temperature, (ii) elevated humidity, (iii) elevated pressure exerted by an oxygen-containing gas, (iv) a hydrogen plasma, and (v) molecular hydrogen, for a time sufficient to enhance the photoluminescence of the composition;

wherein: (i) elevated temperature is from slightly above ambient temperature to a boiling point temperature of the capture fluid; (ii) elevated humidity is from about 30% relative humidity up to 100% relative humidity; and (iii) elevated pressure is from greater than atmospheric pressure to 4,000 psig.

15. The method according to claim 14, wherein the silicon nanoparticle composition has a maximum emission intensity after exposure to the non-ambient condition that is larger than the maximum emission intensity of the silicon nanoparticle composition prior to exposure to the non-ambient condition when excited by light having a wavelength of from 190 to 600 nm.

16. The method according to claim 14, wherein the exposed silicon nanoparticle composition has maximum emission intensity at a wavelength that is between 1.1 and 1.5 times greater than an excitation wavelength of from 190 to 600 nm.

* * * * *